(12) United States Patent
Novak et al.

(10) Patent No.: US 12,738,741 B2
(45) Date of Patent: Sep. 15, 2026

(54) POWER SYSTEMS AND CONTROL METHODS TO ADDRESS PEAK LOADING

(71) Applicant: Flex Ltd., Singapore (SG)

(72) Inventors: James P. Novak, Austin, TX (US); Yi Yuan Chung, New Taipei City (TW); Alexei Tikhonski, Austin, TX (US); James E. Nelson, Austin, TX (US); Guy Raz, Austin, TX (US); Igor Pavlovsky, Austin, TX (US); Robert L. Myers, Austin, TX (US); Pei Chiao Chung, New Taipei City (TW); Sung Hsiang Tsang, New Taipei City (TW); Guanshiun Wang, New Taipei City (TW); Weian Chen, Shenzhen (CN); Xiaodong Liu, Shenzhen (CN); Zhizhi Li, Shenzhen (CN); Deng Yu Tsai, New Taipei City (TW)

(73) Assignee: Flex Ltd., Singapore (SG)

( * ) Notice: Subject to any disclaimer, the term of this patent is extended or adjusted under 35 U.S.C. 154(b) by 0 days.

(21) Appl. No.: 18/826,784

(22) Filed: Sep. 6, 2024

(65) Prior Publication Data

US 2025/0088002 A1 Mar. 13, 2025

Related U.S. Application Data

(60) Provisional application No. 63/581,320, filed on Sep. 8, 2023.

(51) Int. Cl.

| | |
|---|---|
| ***H02J 3/28*** | (2026.01) |
| ***H02J 3/01*** | (2006.01) |
| ***H02J 7/00*** | (2006.01) |
| ***H02J 7/06*** | (2006.01) |

(52) U.S. Cl.
CPC .................................... *H02J 3/28* (2013.01); *H02J 3/01* (2013.01); *H02J 7/06* (2013.01); *H02J 7/865* (2026.01); *H02J 2207/50* (2020.01)

(58) Field of Classification Search
CPC ...................................................... H02J 1/102
See application file for complete search history.

(56) References Cited

U.S. PATENT DOCUMENTS

2012/0267952 A1* 10/2012 Ballatine .................. H02J 7/34 307/26
2025/0135942 A1* 5/2025 Cawthorne ............ B60L 58/20

* cited by examiner

*Primary Examiner* — Daniel Kessie
(74) *Attorney, Agent, or Firm* — Sheridan Ross P.C.

(57) ABSTRACT

A power system includes an energy storage system having a rechargeable energy storage element and a converter connected to the rechargeable energy storage element and configured to connect to a bus so that the energy storage system is connected in parallel with a load and a main power supply system. The energy storage system may cooperate with the main power supply system to supply power to the load with each of the energy storage system and the main power supply system configured as a voltage source with a corresponding droop function. The system may include a control circuit configured to monitor a voltage of the bus and control the converter to either charge or discharge the rechargeable energy storage element based on the voltage of the bus.

17 Claims, 23 Drawing Sheets

POWER SYSTEMS AND CONTROL METHODS TO ADDRESS PEAK LOADING

CROSS REFERENCE TO RELATED APPLICATIONS

This application claims priority to U.S. Provisional Application No. 63/581,320, filed on Sep. 8, 2023, the disclosure of which is hereby incorporated by reference, in its entirety, for all that it teaches and for all purposes.

FIELD

The present disclosure is generally directed to power systems and control methods to address peak loading, for example, in installations with unstable energy sources and/or high dynamic loads.

BACKGROUND

Electrically powered devices are requiring ever increasing energy demands to maintain function. This creates issues where electrical demand runs close to the maximum architectural supply limits and external line input power supply cannot keep up with dynamic demands. There are two major components comprising the electrical systems used in high dynamic loading environments, the energy or power source and the load. Each of these components include many different types, and it is important to balance the total amount of available power from the power source and total power required by the load to avoid bus voltage sway or sag phenomenon that cause a protection event or even equipment damage at both sides.

DETAILED DESCRIPTION

Smoothly balancing the total amount of available power from the source and total power required by the load is now easily affected by the unpredictable characteristics of new technologies such as renewable energy source(s) or the high dynamic load demands of Artificial Intelligence (AI) computation workloads in a computer data center. In the situation of high dynamic loads required by AI workloads and their synchronous nature acting at the single server rack level are magnified by the number of server racks in a data center. In these cases the entire data center power consumption ramps up and down in power faster than the utility is capable of responding, and the potential exists for voltage sags and frequency shifts at the utility level and the tripping of overcurrent protection devices within the data center itself.

Figure 1:
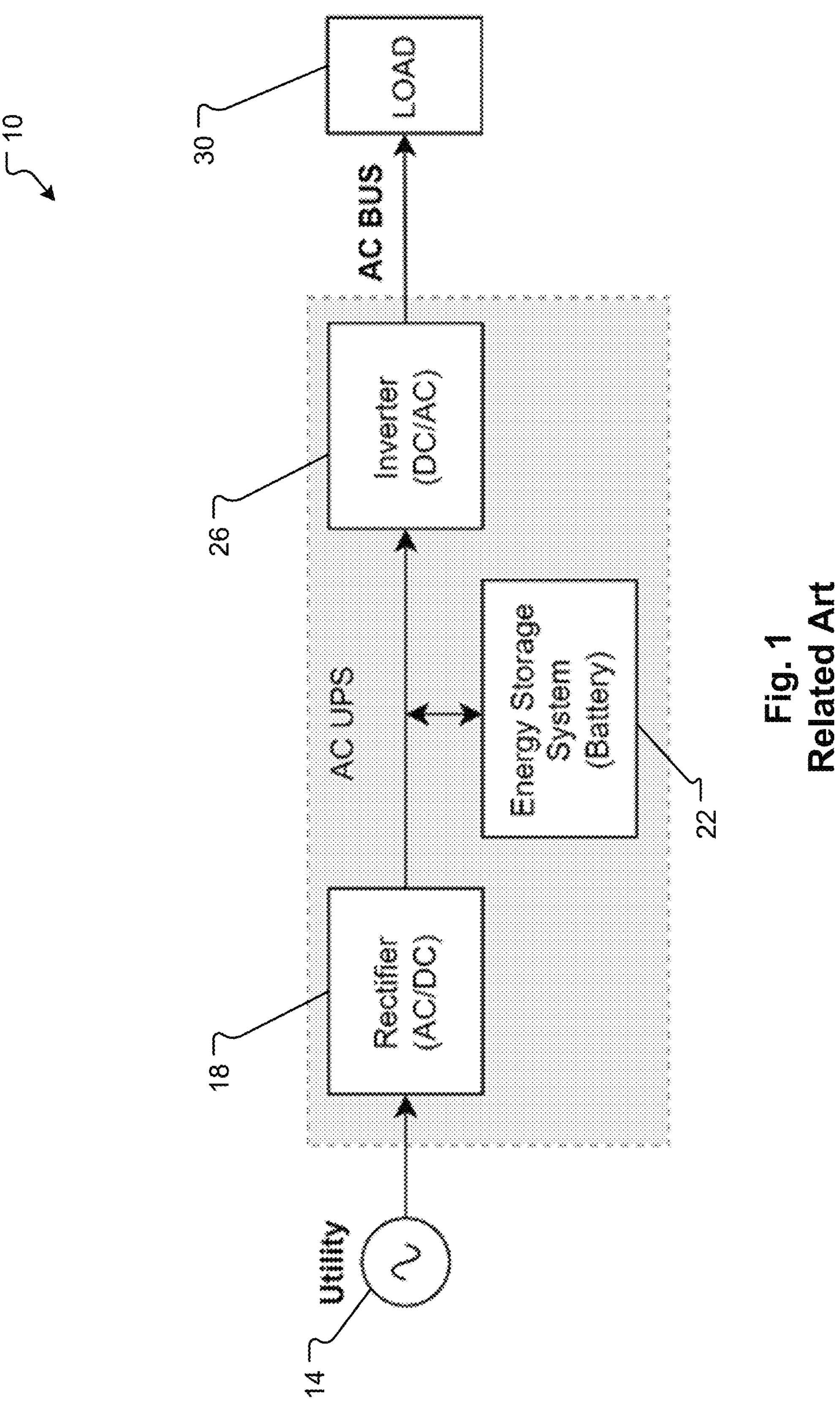
FIG. 1 illustrates a block diagram of a related art power system.

In related art installations, it is common for users to install alternating current uninterruptable power supply (AC UPS) systems as a buffer stage between energy source or utility 14 and a load 30, as shown in FIG. 1 with system 10 that also includes a rectifier 18, an energy storage system 22, and inverter 26. There are energy storage components inside the energy storage system 22, such as different kinds of batteries. When the dynamic load requirement of load 30 is larger than the energy source's 14 capacity, the energy storage component 22 in the UPS will start to discharge, and conversely, will start to charge when the load peak dissipates and load drops below the level where the energy source 14 has available capacity. Because the energy storage system 22 is cascaded in the power delivery path between utility 14 and the load 30, the AC UPS system 10 lacks flexibility and redundancy.

Advantages of embodiments of the present disclosure include at least the following: mitigating the unbalanced phenomenon at the amount of input/output power between energy source and load requirement; improved scalability and flexibility compared to an AC UPS; improved current control ability of a direct current (DC) UPS system; extremely high cycle counts; and fast recharge times (Return to Ready).

Figure 2:
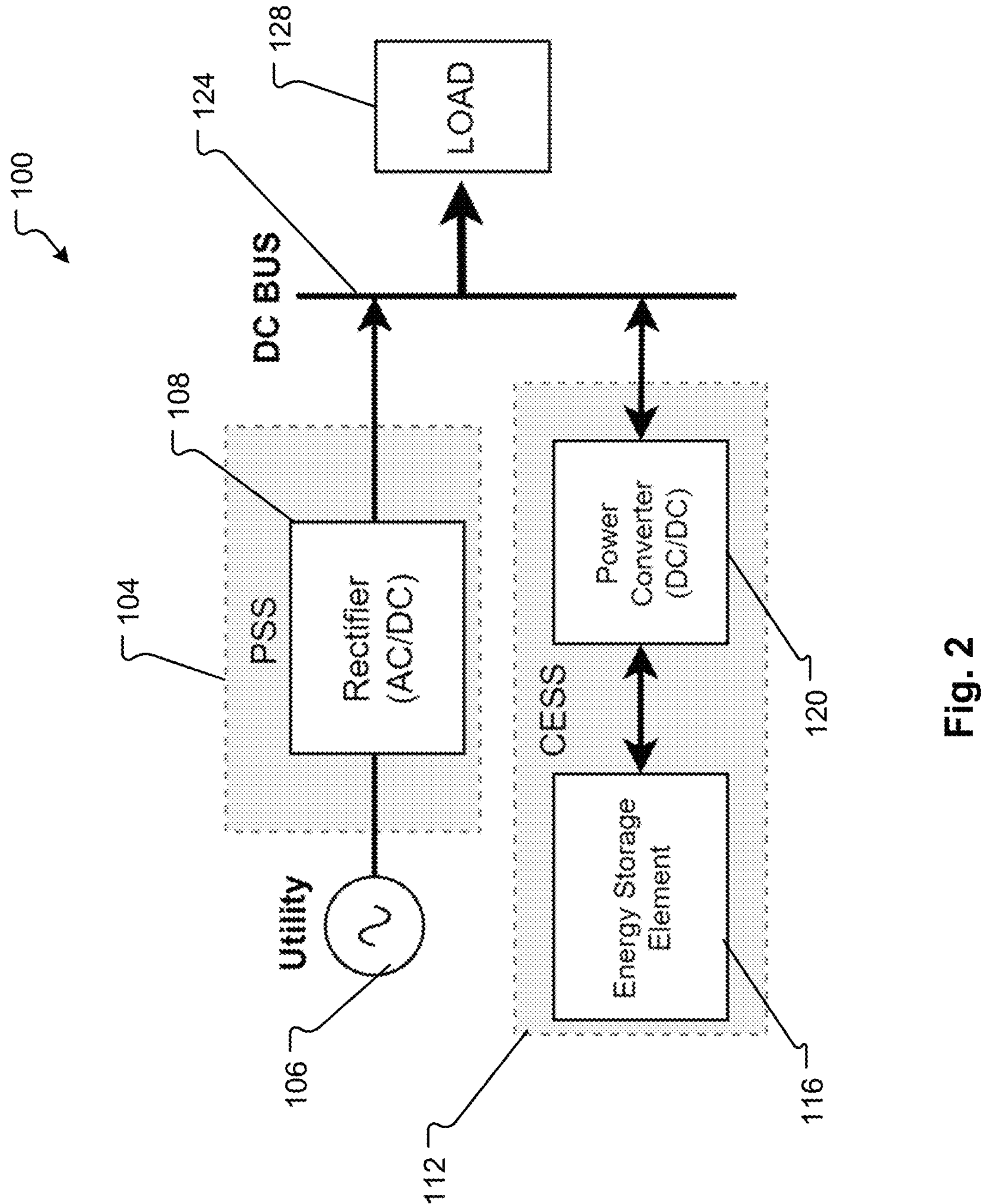
FIG. 2 illustrates a block diagram of a power system according to at least one example embodiment.

FIG. 2 illustrates a power system 100 according to at least one example embodiment. The system 100 includes a main power supply system 104 (also called a "PSS" herein) that includes a power source 106 (e.g., a utility) and a rectifying component 108, a Capacitive Energy Storage System (CESS) 112 that includes a rechargeable capacitive energy storage element 116 (also called an "ESS" herein), and a converter 120 (e.g., a DC/DC converter). The PSS 104 and CESS 112 are connected in parallel to a load 128 through an appropriate high current power bus 124.

A DC UPS application with similar composing elements as 112 in the proposed system 100 offers greater reliability and efficiency compared to traditional AC UPS systems and has been widely adopted in data centers to manage backup functions during AC utility outages. The CESS 112 in the proposed system 100, in addition, offers advantages over typical DC UPS systems that employ batteries as the energy storage system, such as lithium batteries, which are recognized for their high energy density and effectiveness in backup applications. However, batteries have a limited cycle life (typically under 1,000 cycles) and asymmetric charge/discharge performance (with a deviation of up to 20 times between charging and discharging current capabilities) which makes batteries unsuitable for the rapid and frequent charge/discharge demands of AI workloads. AI workloads are typically the type of application can be referred to as having a power filtering requirement. Additionally, there are neither dedicated control algorithms nor symmetrical power delivery converters specifically designed for power filtering applications. As shown in FIG. 2, example embodiments propose using capacitive rechargeable energy storage elements and introduce new control mechanisms to effectively manage power filtering for the illustrated CESS 112. The system 100 can be used to deliver power to loads 128 when system demand increases at a faster rate than the utility 106 is capable of responding.

The Energy Storage Element 116 may include a capacitive source such as a series and parallel connection of capacitors (e.g., multiple groups of capacitors with capacitors in each group being connected in parallel and with each group being connected in series). The capacitors within the Energy Storage Element 116 may comprise rechargeable lithium ion-based capacitors and/or electric double layer (EDL) supercapacitors, which provide the advantage of the high cycle life of a capacitor (millions of cycles), high terminal voltage (2.6-3.8V), high volumetric energy density (26 Wh/l) and extraordinary bi-directional power density (15 kW/l). EDL capacitors and lithium ion capacitors are particularly well suited for use in systems with very high power, fast dynamic load requirements and continuous cycling. The terms capacitor, supercapacitor, ultracapacitor, electric double layer capacitor (EDLC), electric double layer (EDL) capacitor, EDL Supercapacitor, etc. are used interchangeably to describe a rechargeable charge storage element. To those skilled in the art, there are technical differences related to the energy delivery performance, operating voltage and energy storage capacity between these charge storage elements. As may be appreciated, the series and parallel configuration of lithium capacitors or EDL (Electric Double Layer) supercapacitors is configured to meet the stored energy requirements of the application and also to meet the DCIR (DC Internal Resistance) limitations imposed by the input voltage range of the DC-DC converter(s) used when the current through the capacitor is at its maximum level. In addition, capacitors have symmetrical charge and discharge characteristics, meaning a capacitor can be charged just as fast as it is discharged.

In some examples, the Energy Storage Element 116 may additionally or alternatively comprises batteries. However, the advantage of a capacitor-based power source is three-fold: the ability to charge and discharge for millions of cycles, relatively high-power output capability, and the ability to charge and discharge at equal rates. Regardless of the exact composition of the Energy Storage Element 116, the Energy Storage Element 116 has high power density, small size, and exceptionally high cycle life to meet technical requirements of the application.

As described in more detail herein, a CESS 112 is proposed to address the imbalance between the input/output power of the energy source and the load requirements. The system comprises a capacitive energy storage element, control circuit(s), and power flow control methods for DC-DC converters.

Embodiments of the present disclosure include the use of lithium capacitors or EDL supercapacitors as the Energy Storage Element 116 in a high power, high density energy delivery system (referred to as a CESS 112 herein) along with control algorithms and architectures for seamless transition as power supplies or utility line-inputs reach power output or transient power limits.

Although not explicitly shown, it should be appreciated that the system 100 may comprise additional hardware and software used for controlling PSS 104 and CESS 112, such as components for measuring current and voltage at different points within the system (e.g., voltage and current of ESS 116, voltage and current on bus 124, voltage and current of PSS 104, etc.

Figure 3:
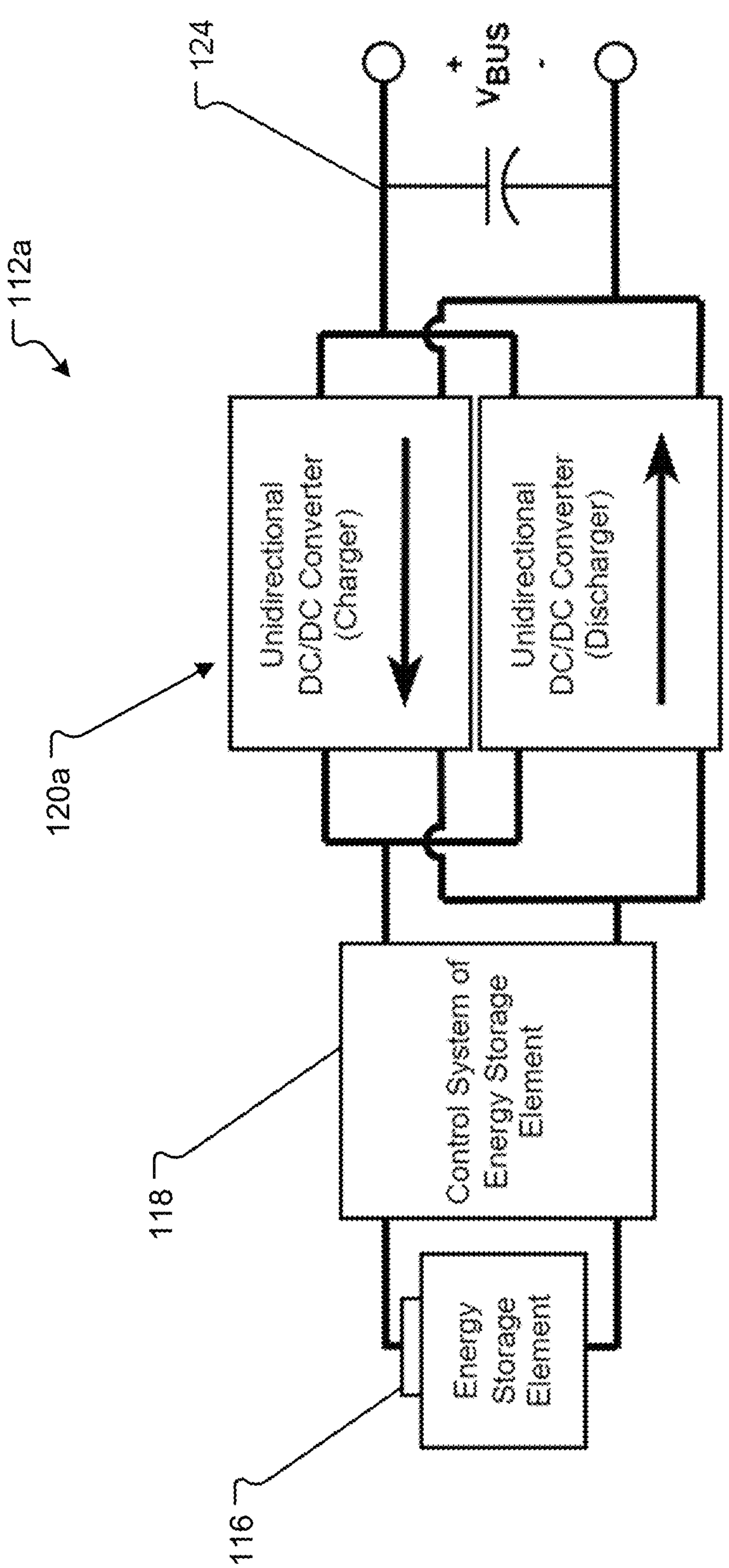
FIG. 3 illustrates a power system that comprises two unidirectional DC/DC converters according to at least one example embodiment.
Figure 4:
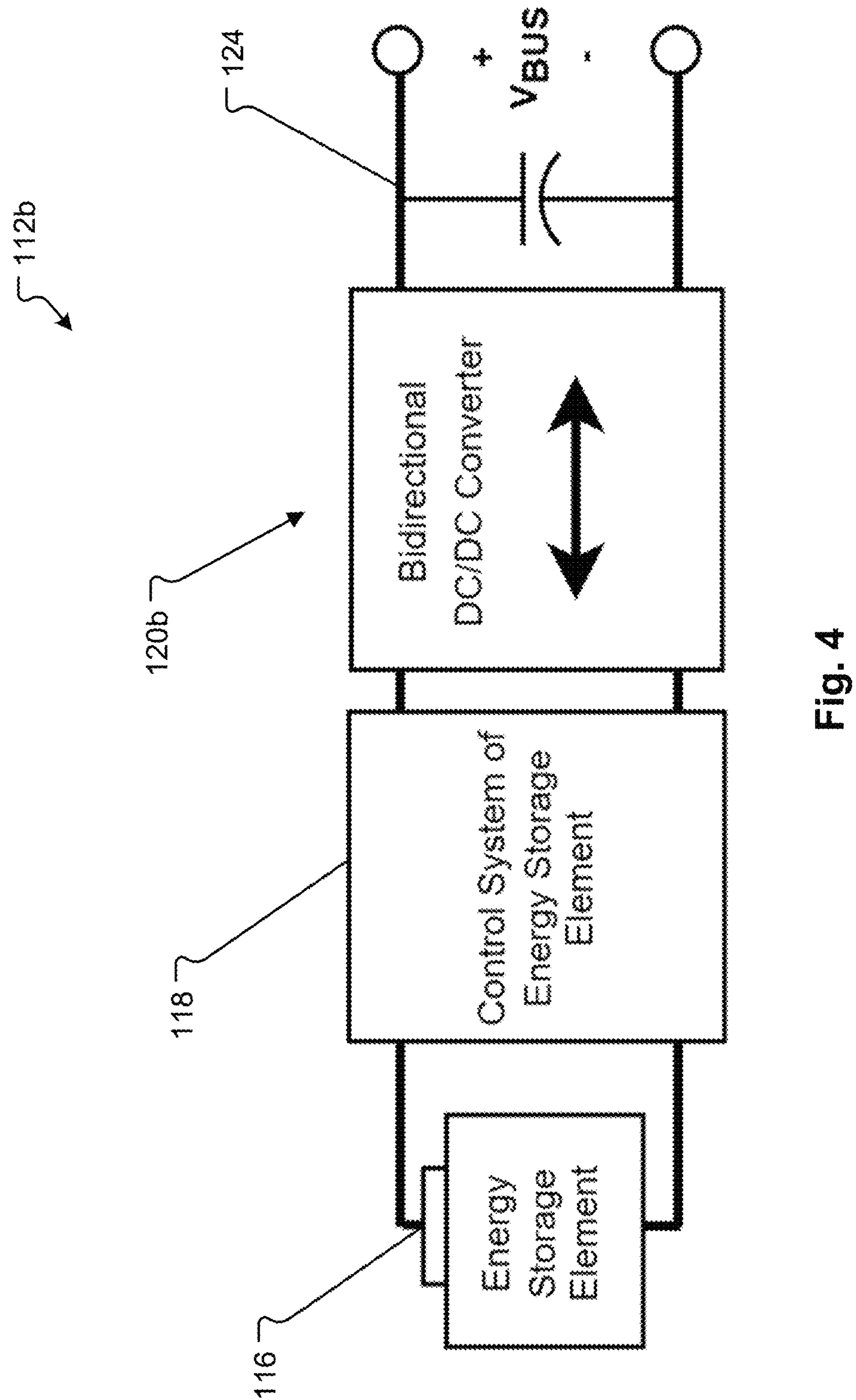
FIG. 4 illustrates a power system that comprises a bidirectional DC/DC converter according to at least one example embodiment.
Figure 5:
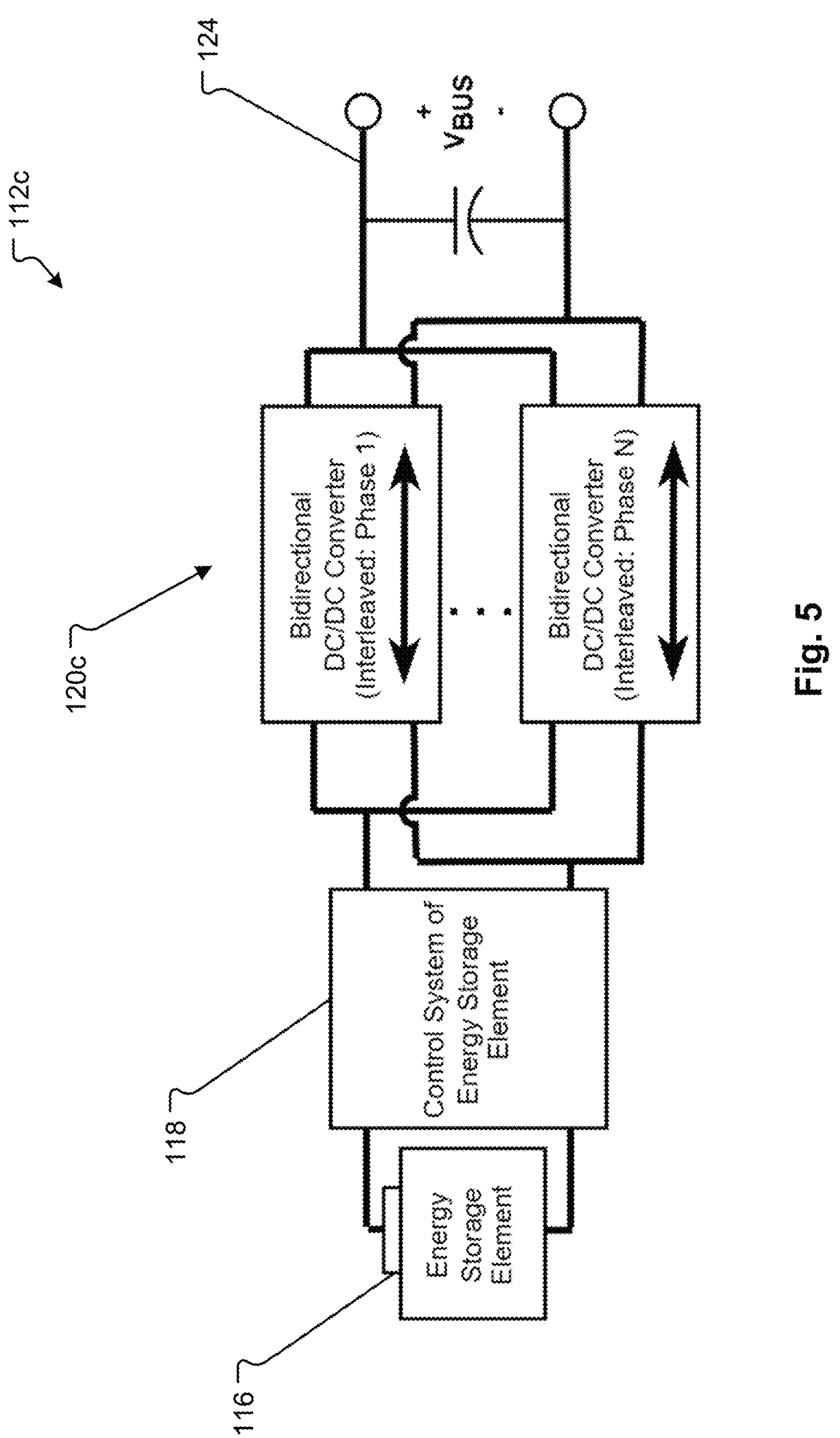
FIG. 5 illustrates a power system that comprises multiple interleaved bidirectional DC/DC converters with phases 1 to N according to at least one example embodiment.

The CESS 112 may have one of the architectures illustrated in FIGS. 3, 4, and 5 as CESSs 112*a*, 112*b*, and 112*c*, respectively. As may be appreciated, the Energy Storage Element 116 shown in FIGS. 3-5 may include a series and parallel configuration of lithium capacitors or EDL supercapacitors configured to meet the stored energy requirements of the application and also to meet the DCIR limitations imposed by the input voltage range of the DC-DC converter(s) used when the current through the capacitor is at its maximum level. As may be further appreciated, each CESS 112*a* to 112*c* illustrates a different configuration for converter 120. In more detail, FIG. 3 illustrates a CESS 112*a* with a converter 120*a* that comprises two unidirectional DC/DC converters-one converter for discharging the Energy Storage Element 116 and one converter for charging the Energy Storage Element 116. FIG. 4 illustrates a CESS 112*b* with a converter 120*b* that comprises a single bi-directional DC/DC converter. Finally, FIG. 5 illustrates a CESS 112*c* with a converter 120*c* comprised of multiple interleaved bidirectional DC/DC converters with phases 1 to N. As may be appreciated, FIGS. 3-5 further illustrate a control system 118 for controlling the Energy Storage Element 116 and/or converters 120*a*-120*c*. Aspects of the control system 118 and its functions are described in more detail below. In general, however, the control system 118 may comprise processing and/or driving capabilities.

As noted herein, systems and methods according to example embodiments solve various problems including but not limited to: the unbalanced phenomenon between the amount of input/output power between energy source and load requirement; low scalability and flexibility; current control ability]; low cycle counts of energy storage devices, and slow recharge times of energy storage devices.

Example embodiments are discussed in more detail below with reference to three parts: 1) the Capacitive Energy Storage Element electrical architecture, which explains the voltage range of an individual capacitor and capacitor matrix as well as some important characteristics; 2) the control system for the Energy Storage Element 116; and 3) the control scheme for a bidirectional DC-DC converter and the primary goals of the proposed application.

1. ESS Electrical Architecture

The Energy Storage Element 116 is designed to have a voltage that matches the DC-DC converter 120 input. For example, the converter 120 may be a DC boost circuit with an output of 48V and an input range of 30V to 46V. The ranges may cover a higher or lower voltage at the expense of reduced efficiency. The individual capacitors of the Energy Storage Element 116 can be combined such that the sum of the voltage operating range of the series capacitors matches and is centered within the DC converter input range. For example, a lithium capacitor may be charged to 3.8V. An array of 12 such lithium capacitors electrically connected in series would give a maximum voltage of 45.6V when fully charged to 3.8V each, which is at the upper voltage limit of each capacitor but still within the range of 30V-46V of the above example of DC-DC (boost) converter 120.

Capacitors of the Energy Storage Element 116 can be combined in parallel to increase the total energy of the Energy Storage Element 116. The capacitors may be characterized by the number of Joules of energy available to the system. Increasing the total energy by paralleling individual capacitors before connecting the paralleled elements in series will increase available energy. The total energy storage in Joules of such a series and parallel configuration of capacitors, each with a capacitance value of $C_{element}$ is represented in Equation 1 below.

$$\text{Energy total} = \frac{1}{2} * \left[\frac{Celement * P}{S}\right] * \left[(\text{Vmax} * S)^2 - (\text{Vmin} * S)^2\right]$$

Equation 1—Equation for calculating the sum of all energy storage elements in Joules, where P is the number of parallel capacitors, and S is the number of series connected paralleled capacitor blocks, operating between maximum charge voltage ($V_{max}$) and a minimum discharge voltage ($V_{min}$).

In some examples, the total energy in Joules of the system may also be improved by a combination of a plurality of series and/or parallel connection of capacitors with a plurality of series and/or parallel connection of batteries. In this case, the voltage of the plurality of capacitors is held higher than the voltage of the plurality of batteries such that the capacitors will discharge before the batteries thus reducing the frequency and depth of discharge of the batteries in the system. The batteries can be used to maintain system voltage as capacitors are nearing energy depletion, which may extend discharge time. In this case, the batteries have minimal depth of discharge that extends cycle lifetime.

Figure 6:
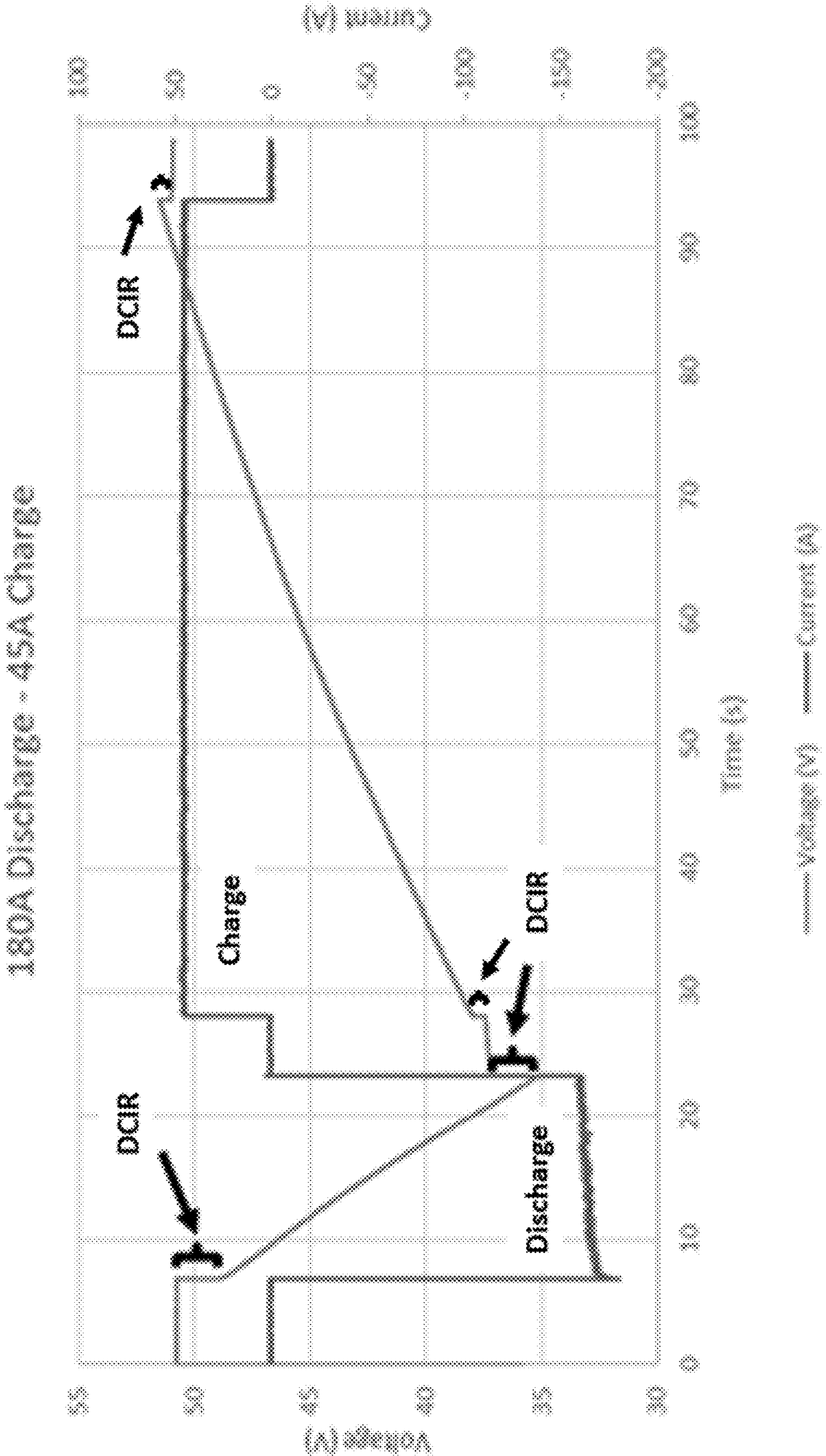
FIG. 6 illustrates an example of a single capacitor Direct Current Internal Resistance (DCIR) voltage drop resulting from load current, occurring within a single capacitor contained within a series/parallel connected capacitor based energy storage element according to at least one example embodiment.

Capacitors such as lithium capacitors and EDL supercapacitors have a measurable DC Internal Resistance (DCIR) that can be tracked. The DCIR may be calculated by measurement of the voltage drop (V2−V1) when going from no-load to full load (I2−I1) according to DCIR=ΔV/ΔI, where I is the current (Amperes) and V is the Voltage (Volts). An example of a load-based DCIR voltage drop is shown in FIG. 6. As illustrated, the DCIR will cause a voltage drop across the capacitor stack the instant when load is applied. This offset effectively shifts the output voltage curve under load to a lower terminal voltage when current is present—the higher the current, the higher the voltage offset. This offset must be accounted for when considering the proper series capacitor count when compared to the operating voltages for the input to the DC-DC converter 120. The system equivalent DCIR ($DCIR_{eq}$) by scaling DCIR of the individual energy supply element by the number of series and parallel connections in the overall system. This is represented in Equation 2 below.

$$DCIR_{eq} = \frac{DCIR_{single} \cdot S}{P}$$

Equation 2—equation for calculating the Equivalent System DCIR related to the DCIR of a single storage element scaled for the number of series(S) and parallel (P) energy storage elements.

2. Energy Storage Element Control Architecture

Capacitive energy systems such as described herein require active monitoring and balancing of individual capacitor voltages continuously during operation. The system described in U.S. Pat. No. 11,121,415 Monitoring System for Series Connected Battery Cells (incorporated herein by reference) is ideal for this task when battery cells are replaced by capacitors, and may constitute at least part of the energy storage system controller 118 in FIG. 4. Methods described in the patent have the advantage of coulomb counting for determining in situ the present capacitance value of each capacitor in the system at any point during its operational life and thus comparisons over time are facilitated to measure capacitor aging. The method also achieves active cycle counting.

3. Bidirectional Power Flow Control Architecture

Figure 7:
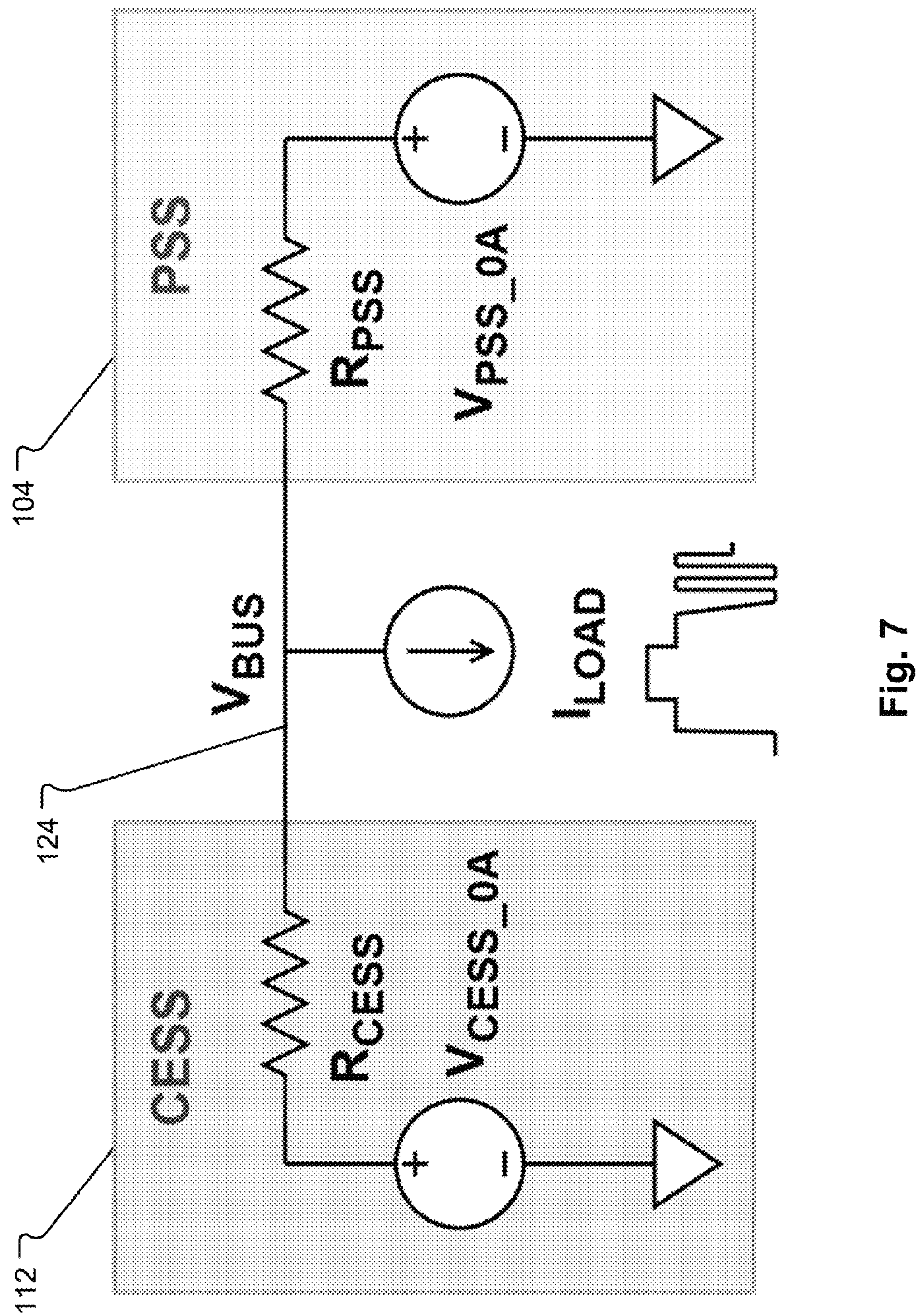
FIG. 7 illustrates a parallel type of storage system having a Capacitive Energy Storage System (CESS) and a main power supply system (PSS) both configured as a voltage source according to at least one example embodiment.

FIG. 7 illustrates a parallel type of energy storage system with a CESS 112 having a Capacitive Energy Sturge Element 116 along with a current source type of power supply system (PSS) 104. Stated another way, the PSS 104 may be configured as a voltage source with voltage $V_{PSS\_0A}$ having a resistive drop due to resistance $R_{PSS}$ while the CESS 112 is configured as a voltage source of voltage $V_{CESS\_0A}$ having a resistive drop due to resistance $R_{CESS}$.

The goals of the proposed power flow control architecture are: (1) bus voltage regulation by keeping $V_{BUS}$ at a proper level; and (2) keeping the CESS away from the system break point, in other words, avoid a fully charged/discharged condition of CESS (0%<CESS state of charge (SOC) <100%); and (3) AC harmonics filtering: filtering the dynamic power flow at the PSS side.

Figure 8:
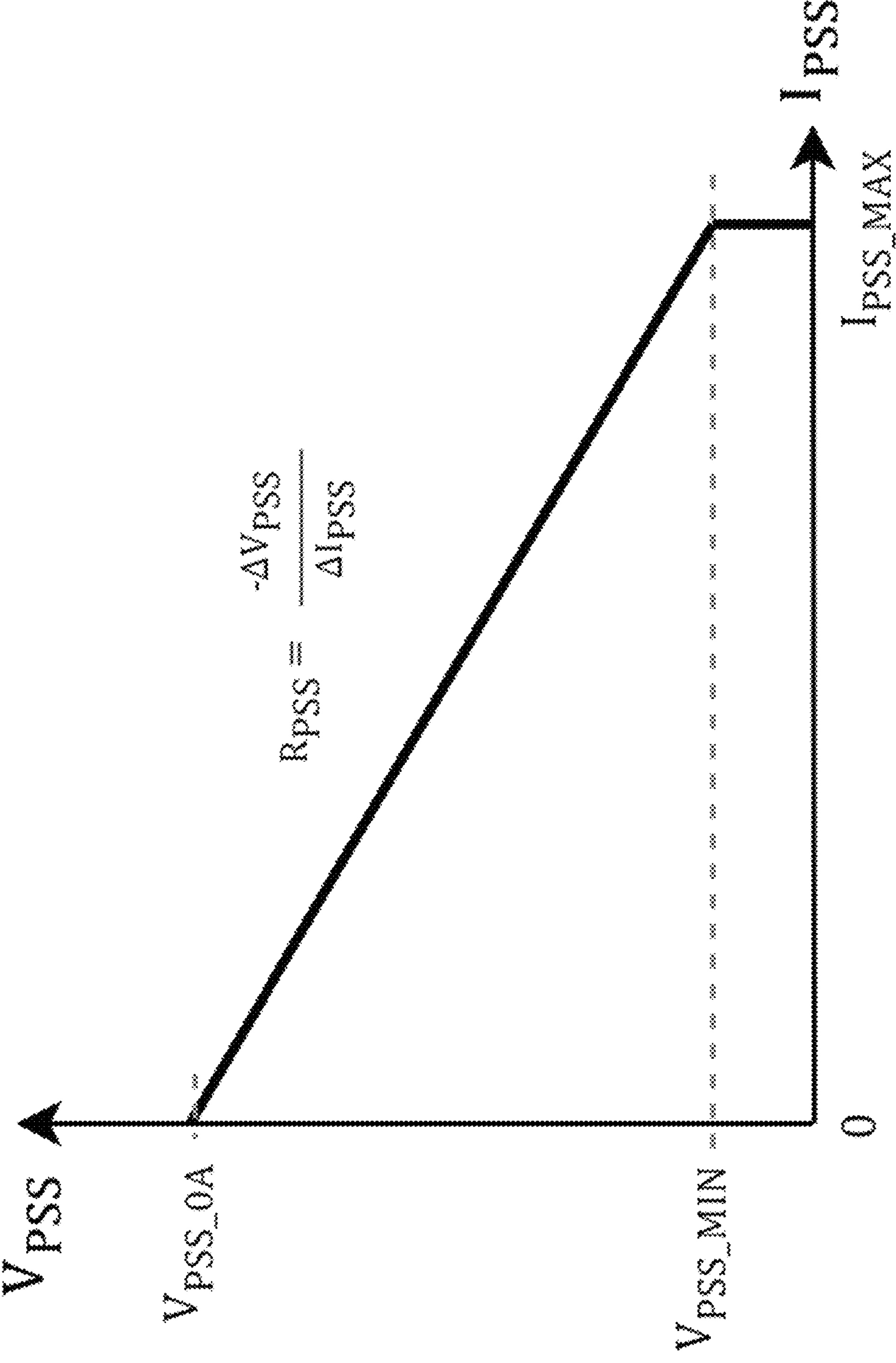
FIG. 8 illustrates an output characteristic of a main power supply system controlled as a voltage source with a droop function according to at least one example embodiment.
Figure 9:
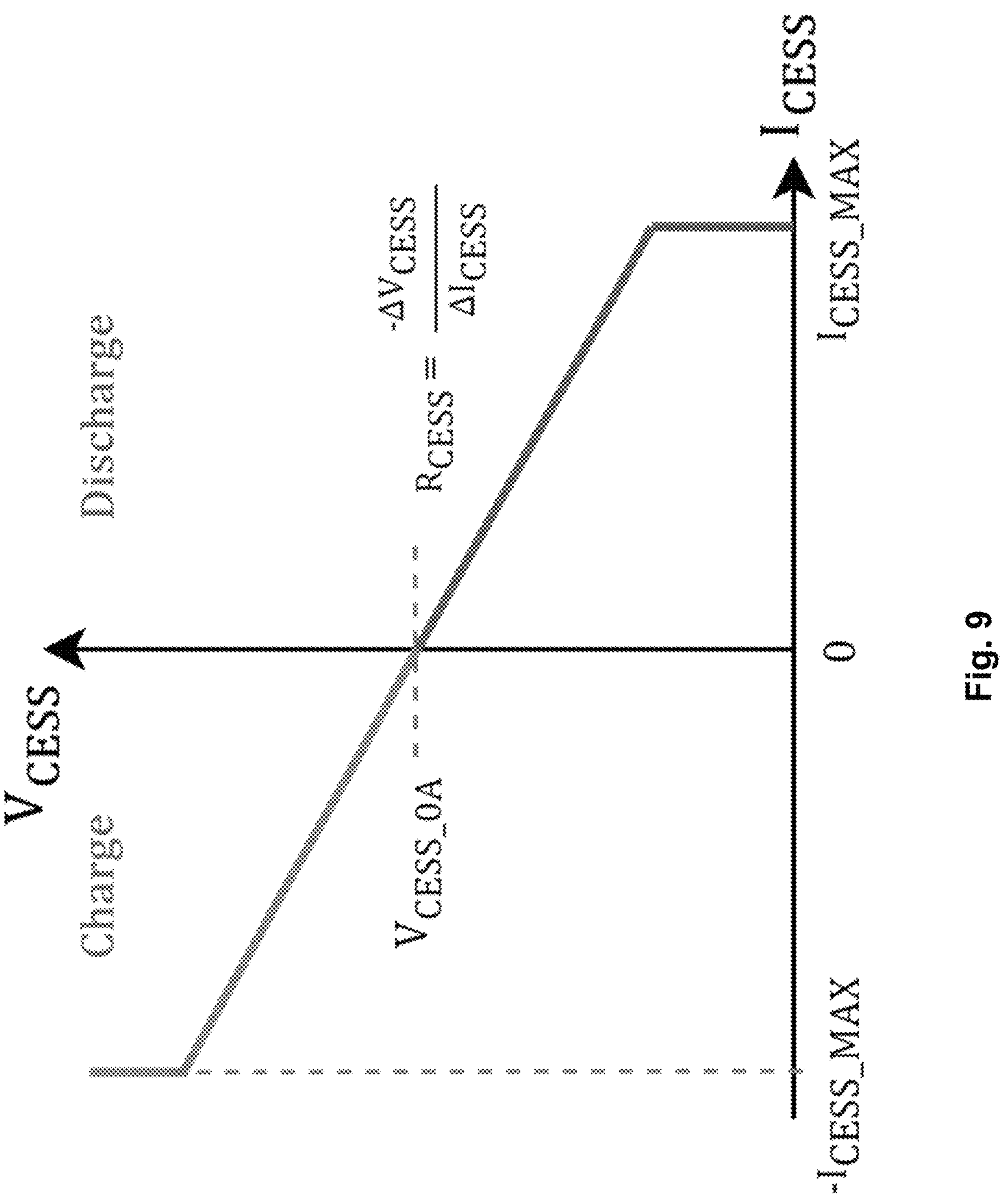
FIG. 9 illustrates a bidirectional output characteristic of a Capacitive Energy Storage System (CESS) controlled as a voltage source with a droop function according to at least one example embodiment.

To achieve goal #1 (keeping $V_{BUS}$ at the proper level), the output characteristics of PSS 104 and CESS 112 represent voltage sources, meaning each system can regulate the bus voltage $V_{BUS}$ without the other system's aid. For example, the output characteristic of the PSS 104 is controlled as voltage source with an output droop function, $R_{PSS}=(V_{PSS\_0A}-V_{PSS\_MIN})/(I_{PSS\_MAX})$, as shown in FIG. 8. $R_{PSS}$ is an equivalent output resistance of the PSS 104, $V_{PSS\_0A}$ and $V_{PSS\_MIN}$ are values that limit the bus regulation range, with $V_{PSS\_0A}$ being the voltage of PSS 104 with zero load and $V_{PSS\_MIN}$ being the voltage of PSS 104 at maximum load. Meanwhile, $I_{PSS\_MAX}$ is the maximum output current for PSS 104 (e.g., at maximum load). The character of the CESS 112 is to compensate the power of source/load requirement and regulate DC bus voltage. In at least one embodiment, the output characteristic of the CESS 112 is controlled as a voltage source with a droop function ($R_{CESS}=(V_{CESS\_MAX}-V_{CESS\_MIN})/(2*\Delta I_{CESS\_MAX})$), as shown in FIG. 9, where $R_{CESS}$ is an equivalent output resistance of the CESS 112, $V_{CESS\_MAX}$ and $V_{CESS\_MIN}$ represent the maximum and minimum output bus voltage boundary if the CESS 112 is operating at maximum load in a charge condition or a discharge condition. Meanwhile, $I_{CESS\_MAX}$ is the maximum output current of CESS 112 (e.g., at maximum load).

Still with reference to FIG. 9, for the output characteristic of the CESS 112, there is neither discharge nor charge behavior if bus 124 voltage $V_{BUS}$ (e.g., real-time bus voltage) is equal to the voltage $V_{CESS\_0A}$ of CESS 112 (where $V_{CESS\_0A}$ is the zero current voltage set point for the CESS 112 that varies according to system design). However, when $V_{BUS}$ is larger than $V_{CESS\_0A}$, CESS 112 starts to charge, and when $V_{BUS}$ is less than $V_{CESS\_0A}$, CESS 112 starts to discharge. Stated another way, if $V_{BUS-CESS\_0A}$ is negative, then CESS 112 discharges energy through the Power Converter 120 to DC bus 124, and if $V_{BUS-CESS\_0A}$ is positive, then Energy Storage Element 116 charges with energy through the Power Converter 120 from DC bus 124. As may be appreciated from FIG. 9, the amount of charge and discharge current depends on the amount of voltage difference between $V_{BUS}$ and $V_{CESS\_0A}$. For example, the amount of charge and discharge current from CESS 112 becomes greater as the difference between $V_{BUS}$ and $V_{CESS\_0A}$ becomes greater.

Figure 10:
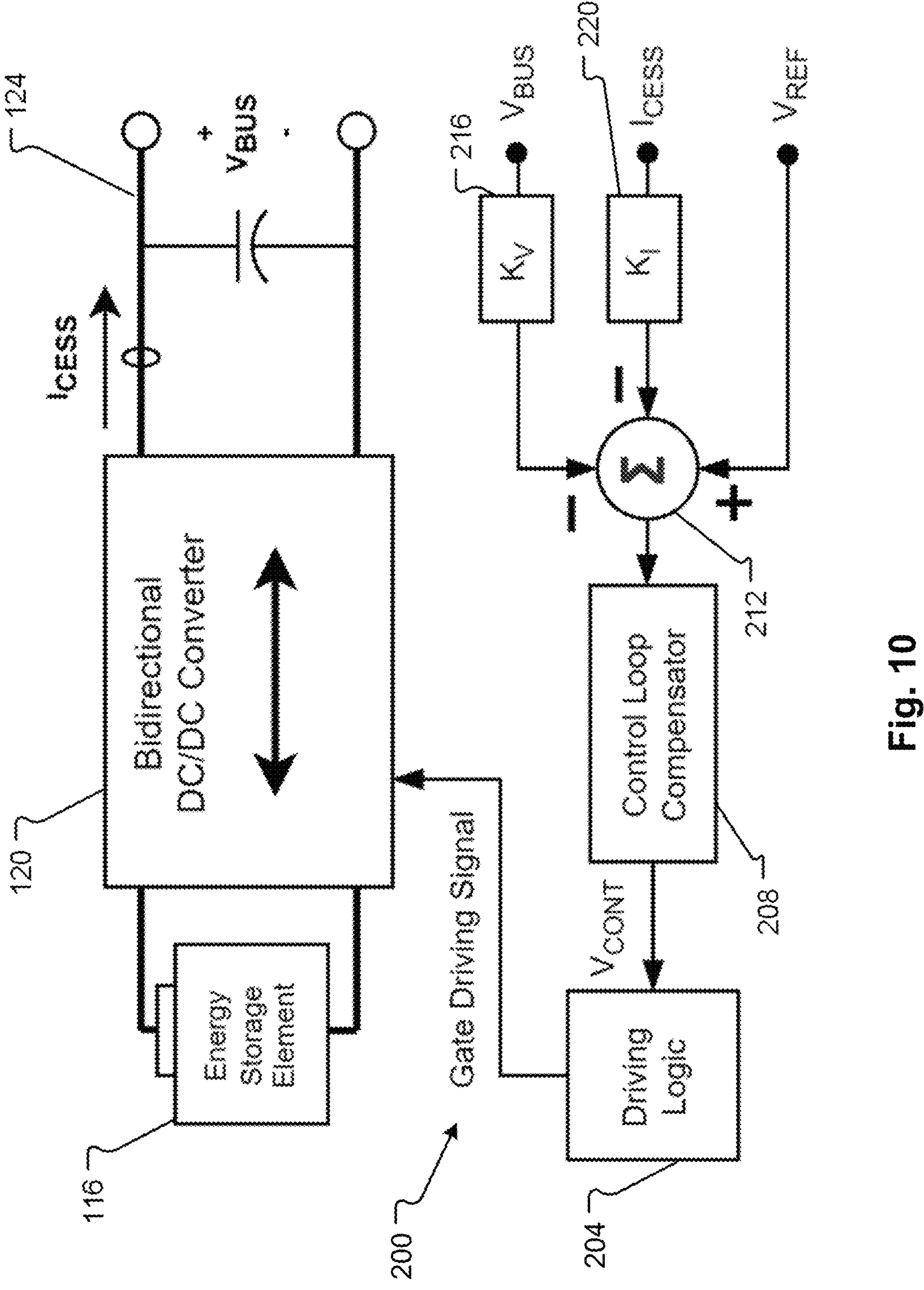
FIG. 10 illustrates a block diagram of a control system for a Power Converter with a CESS to achieve bidirectional charge/discharge behavior according to at least one example embodiment.
Figure 11:
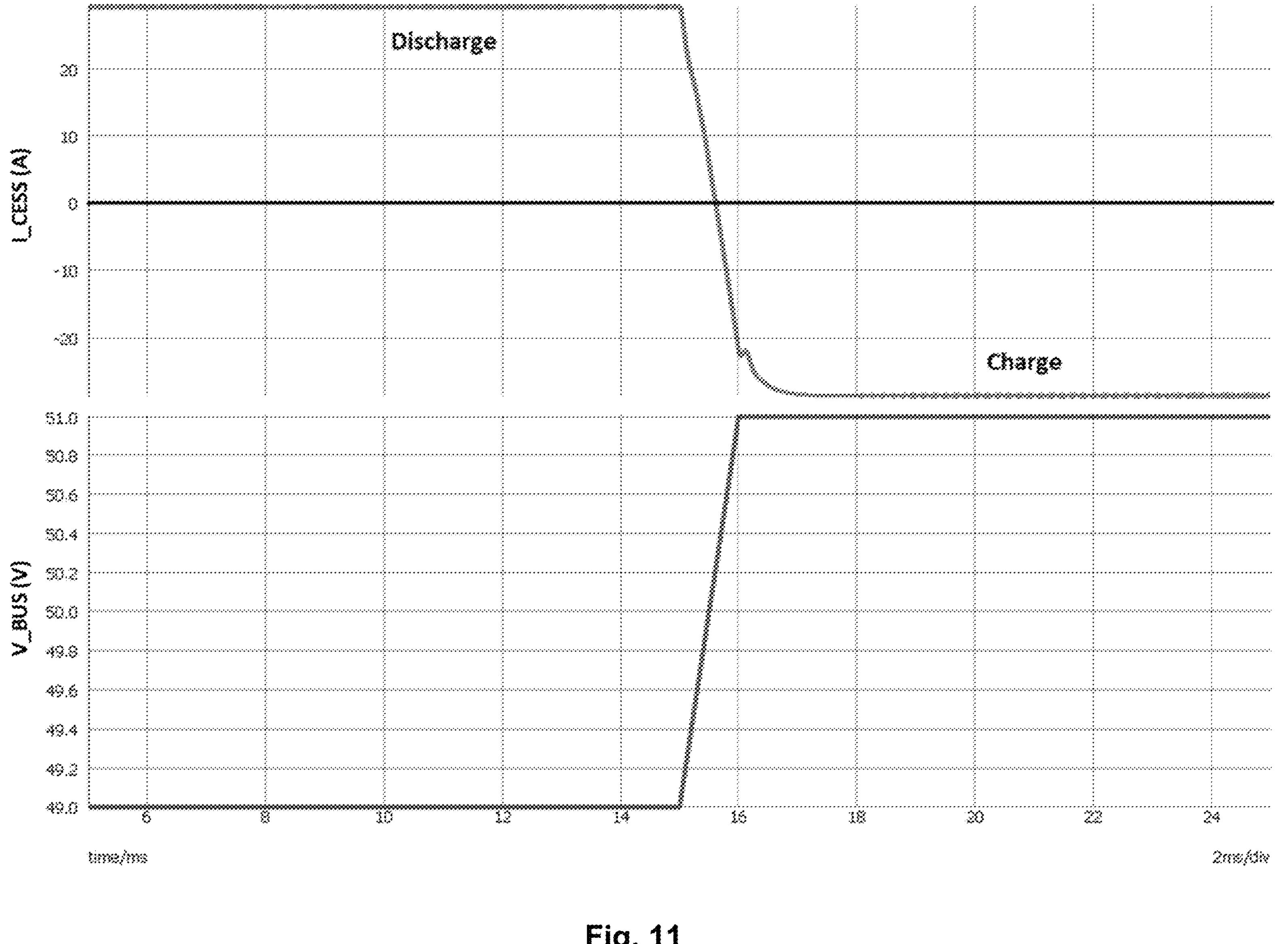
FIG. 11 illustrates the fast and smooth charge and discharge transition using the control mechanism of FIG. 10 according to at least one example embodiment.

FIG. 10 illustrates a block diagram to achieve the above-described bidirectional charge/discharge behavior. The charge and discharge switch transition is fast and smooth with the control mechanism of FIG. 10, as shown in FIG. 11. In the simulation result, $V_{CESS\_0A}$ is 50V, bus voltage step-up from 49V to 51V within 1 ms, and the current flow direction changes from discharge to charge immediately. As shown in FIG. 10, various illustrated elements may be included with or correspond to a control circuit 200. In the illustrated example, the control circuit 200 comprises driving logic 204 for generating a gate driving signal that drives the converter 120 based on a control signal $V_{CONT}$ output by control loop compensator 208, where $V_{CONT}$ is generated based on output of a summation circuit 212. Compensator 208 may comprise circuitry that converts an input signal into an appropriate control signal (e.g., $V_{CONT}$) or other signal appropriate for digestion by a downstream circuit. For example, the compensator 208 may generate $V_{CONT}$ by processing the error amount (or difference) between $V_{REF}$ and ($k_V*V_{BUS}+k_I*I_{CESS}$). The compensator 208 may be implemented with circuitry (i.e., hardware) or firmware coding. As shown, the summation circuit 212 receives and operates on a reference voltage signal $V_{REF}$ and signals from circuits 216 and 220. The output of circuit 216 is based on $V_{BUS}$ as measured on bus 124 and the output of circuit 220 is based on $I_{CESS}$ as measured on bus 124. Each circuit 216 and 220 may convert its input $V_{BUS}$ or $I_{CESS}$ into an analog signal according to respective weights K. Equation 3 below shows the relationship between $V_{REF}$, $V_{BUS}$, the K values and $I_{CESS}$.

$$V_{BUS}=\frac{V_{REF}}{K_V}-I_{CESS}\cdot\frac{K_I}{K_V}$$

SOC Regulation Control (SRC)

Figure 12:
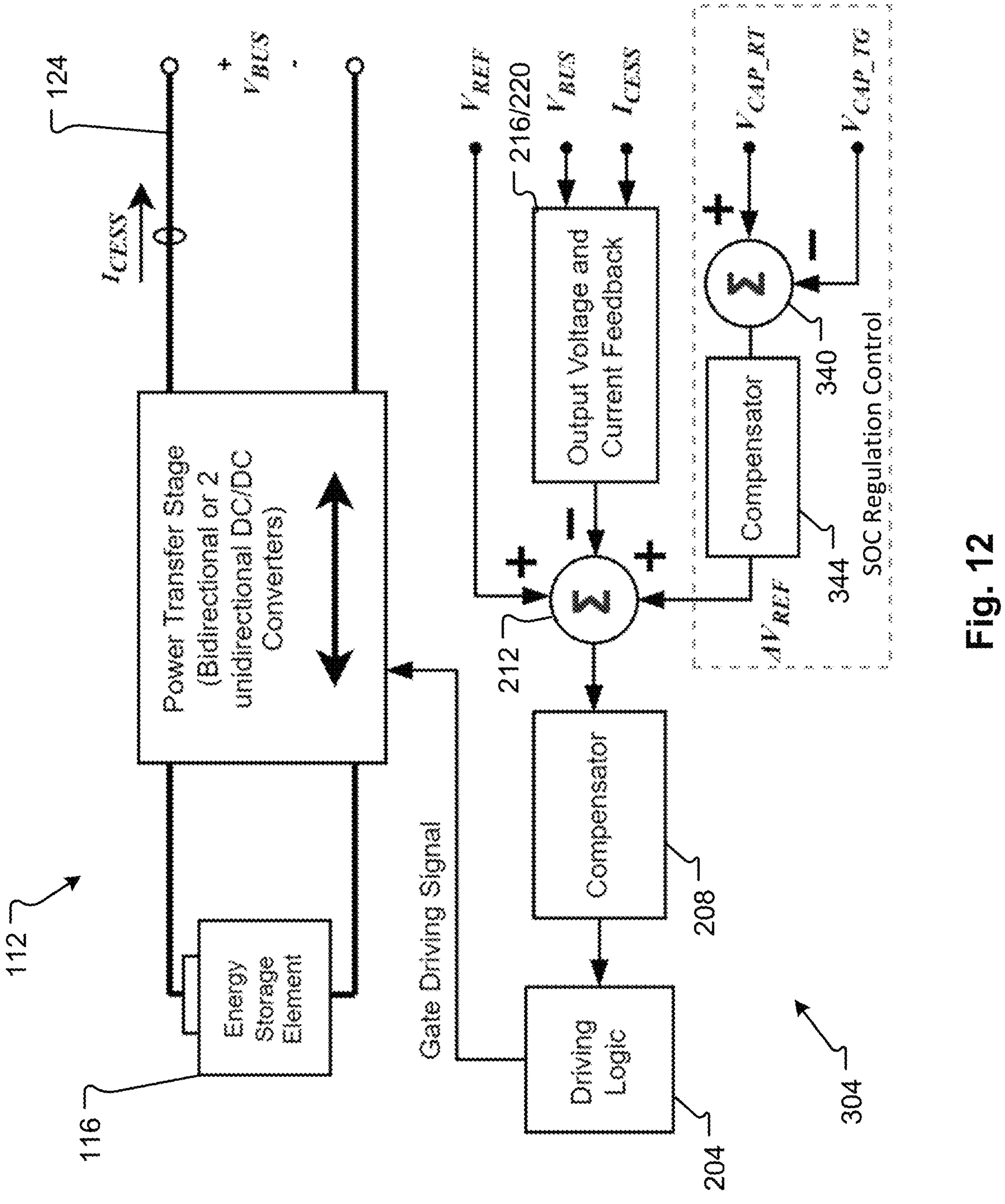
FIG. 12 illustrates a block diagram of components for implementing a SOC regulation mechanism for a CESS according to at least one example embodiment.

To achieve goal #2 (keeping the CESS away from the system break point), CESS 112 needs to keep its energy storage level, which is the SOC or capacitor voltage, within a certain proper range (e.g., 2.2V-3.8V for single lithium capacitor). In at least one embodiment, the CESS 112 regulates the capacitor voltage to regulate the SOC to keep the system away from the break point. FIG. 12 illustrates a block diagram of components for implementing an SOC regulation mechanism and FIGS. 13A and 13B illustrate the control methods implemented by control circuit 304.

Figure 13A:
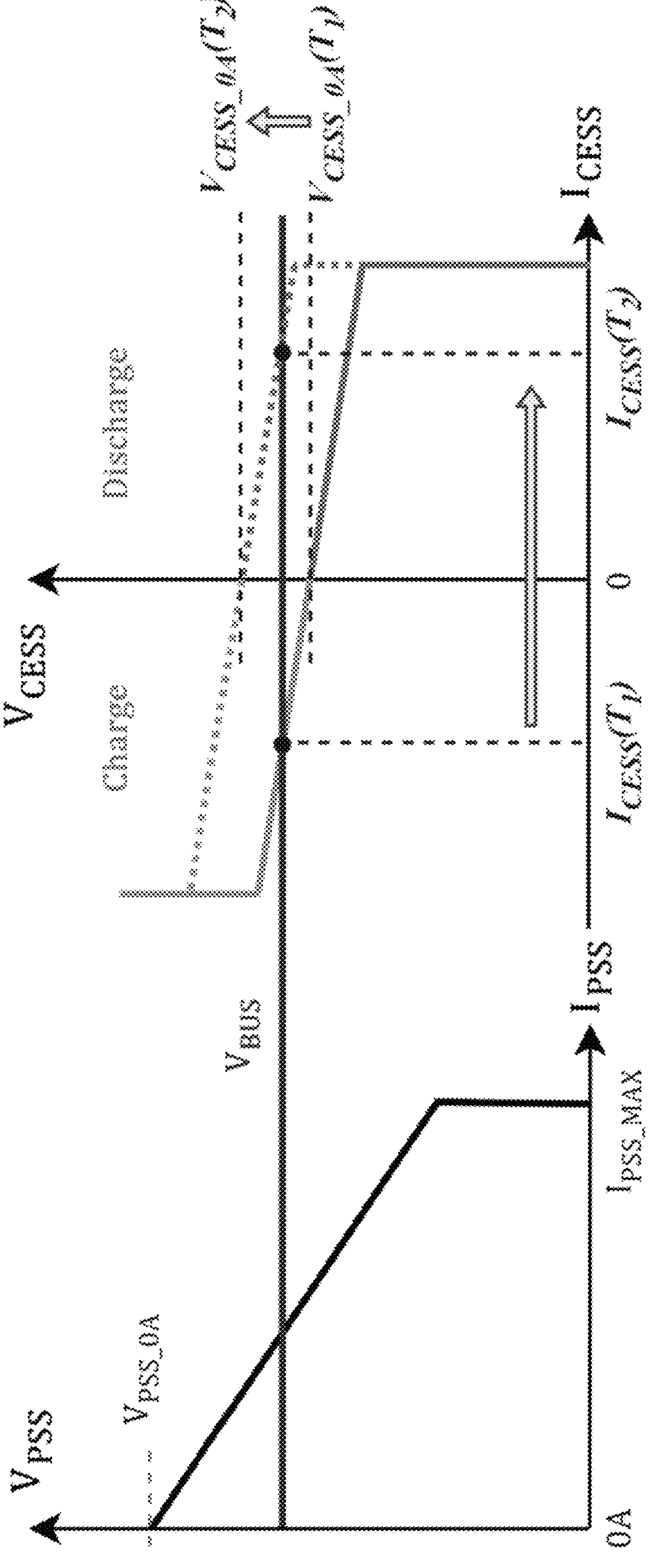
FIGS. 13A and 13B illustrate the control methods implemented by the components illustrated in FIG. 12 according to at least one example embodiment.
Figure 13B:
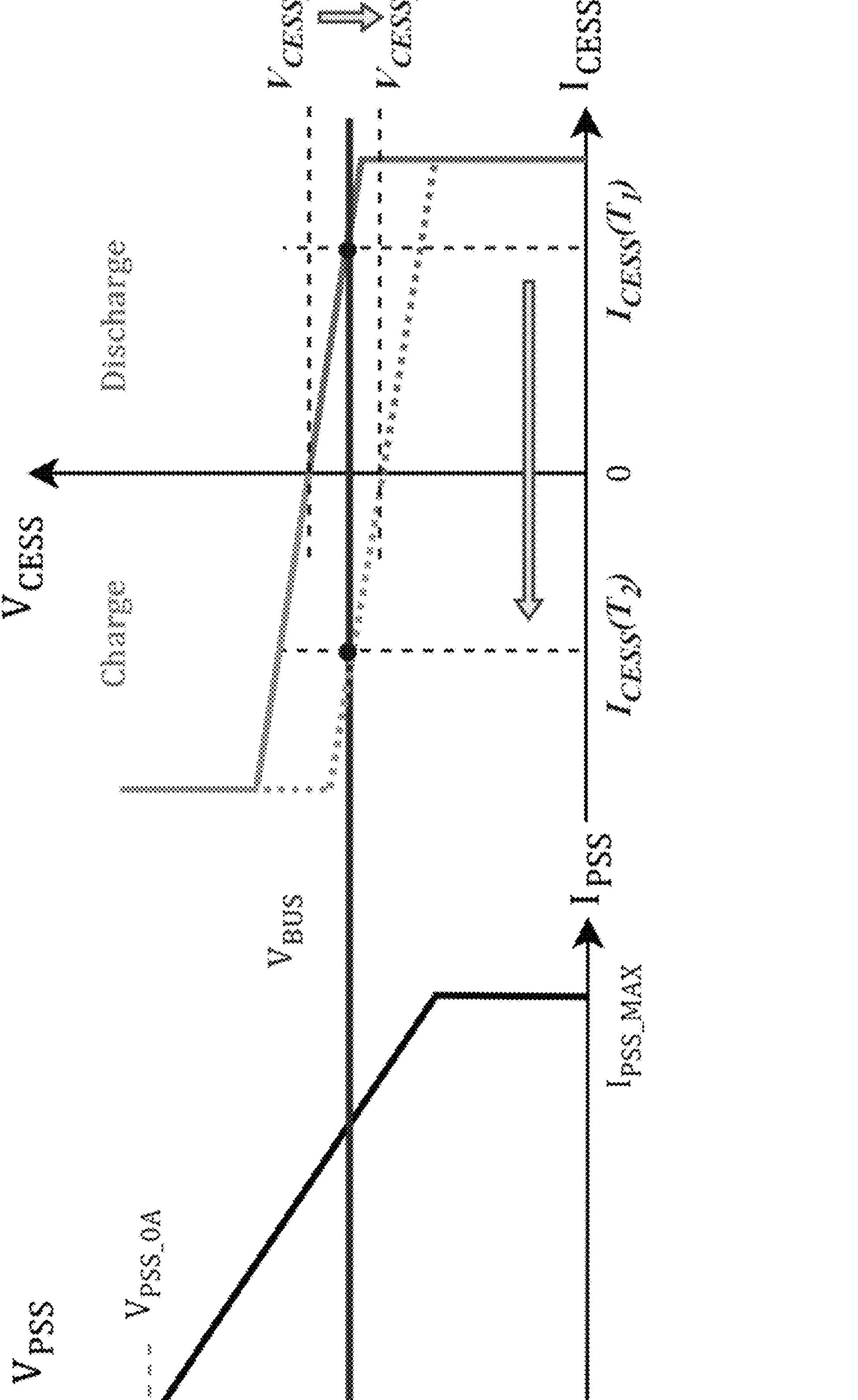

With reference to FIGS. 12-13B, control circuit 304 includes some of the same of similar circuits as FIG. 10 with driving logic 204 for driving the converter 120 of the CESS stage 112, compensator 208, summation circuit 212, and feedback block 216. Control circuitry 304 further includes an SOC regulation control circuit that includes summation circuit 340 and compensator 344. As may be appreciated, summation circuit 212 receives and operates on the illustrated voltage values $\Delta V_{REF}$, $V_{REF}$, and output of feedback block 216/220 that outputs a signal based on $V_{BUS}$ and $I_{CESS}$ (in the same or similar manner as accomplished by blocks 216 and 220 in FIG. 10). As shown, $\Delta V_{REF}$ is output from compensator 344 whose input is from summation circuit 340 that determines a difference between real-time capacitor voltage $V_{CAP\_RT}$ and a target value $V_{CAP\_TG}$. As may be appreciated, the illustrated compensators serve the same or similar function(s) as described with reference to the compensator 208 of FIG. 10. Driving logic 328, compensator 332, and summation circuit 336, and feedback block 348 may be the same as or perform the same functions as driving logic 204, compensator 208, summation circuit 212, and circuits 216/220, respectively.

With reference to FIG. 13A, if the system load suddenly drops and the bus voltage steps up, CESS 112 will start charging ($t=T_1$). The real time state of charge $SOC_{RT}$ will start increasing while $I_{CESS}(T_1)$ is less than 0 A (here, $SOC_{RT}$ and $SOC_{TG}$ be related to $V_{CAP\_RT}$ and $V_{CAP\_TG}$, either directly (i.e., $SOC_{RT}$ is $V_{CAP\_RT}$ and $SOC_{TG}$ is $V_{CAP\_TG}$) or indirectly (i.e., $SOC_{RT}$ can be derived or inferred from $V_{CAP\_RT}$ and $SOC_{TG}$ can be derived or inferred from $V_{CAP\_TG}$). $\Delta V_{REF}$ will then increase while $SOC_{RT}$ is larger than a target state of charge $SOC_{TG}$, with its variation duration determined by compensation parameters (e.g., K values). As $V_{REF}$ increases accordingly, the zero-current set point of $V_{CESS\_0A}$ of CESS 112 increases to introduce discharge current ($I_{CESS}(T_2)>0$ A) to the bus 124 until $SOC_{RT}$ is equal to $SOC_{TG}$.

With reference to FIG. 13B, if the system load suddenly increases and the bus voltage steps down, CESS 112 will start discharging ($t=T_1$). $SOC_{RT}$ will start to decrease while $I_{CESS}(T_1)$ is greater than 0 A as the discharge process. $\Delta V_{REF}$ will then decrease while $SOC_{RT}$ is larger than $SOC_{TG}$, with its variation duration is determined by compensation parameters (e.g., K values). As $V_{REF}$ decreases accordingly, the zero-current voltage setpoint $V_{CESS\_0A}$ decreases to introduce charge current ($I_{CESS}(T_2)$<0 A) to the bus until $SOC_{RT}$ is equal to $SOC_{TG}$.

To achieve goal #3 (filtering dynamic power flow at the PSS side), there are two examples of methods/circuitry that can accomplish this goal discussed below as passive filtering and active filtering.

Passive Filtering by Droop

Given the nature of the output characteristics of the PSS 104 and CESS 112 shown in FIGS. 8 and 9, the dynamic current sharing ratio between the two systems can be determined by Equation 4 to achieve passive filtering by droop.

$$\Delta I_{CESS}: \Delta I_{PSS} = R_{PSS}: R_{CESS}$$

Equation 4—Dynamic current ratio between PSS and CESS by droop

Figure 14:
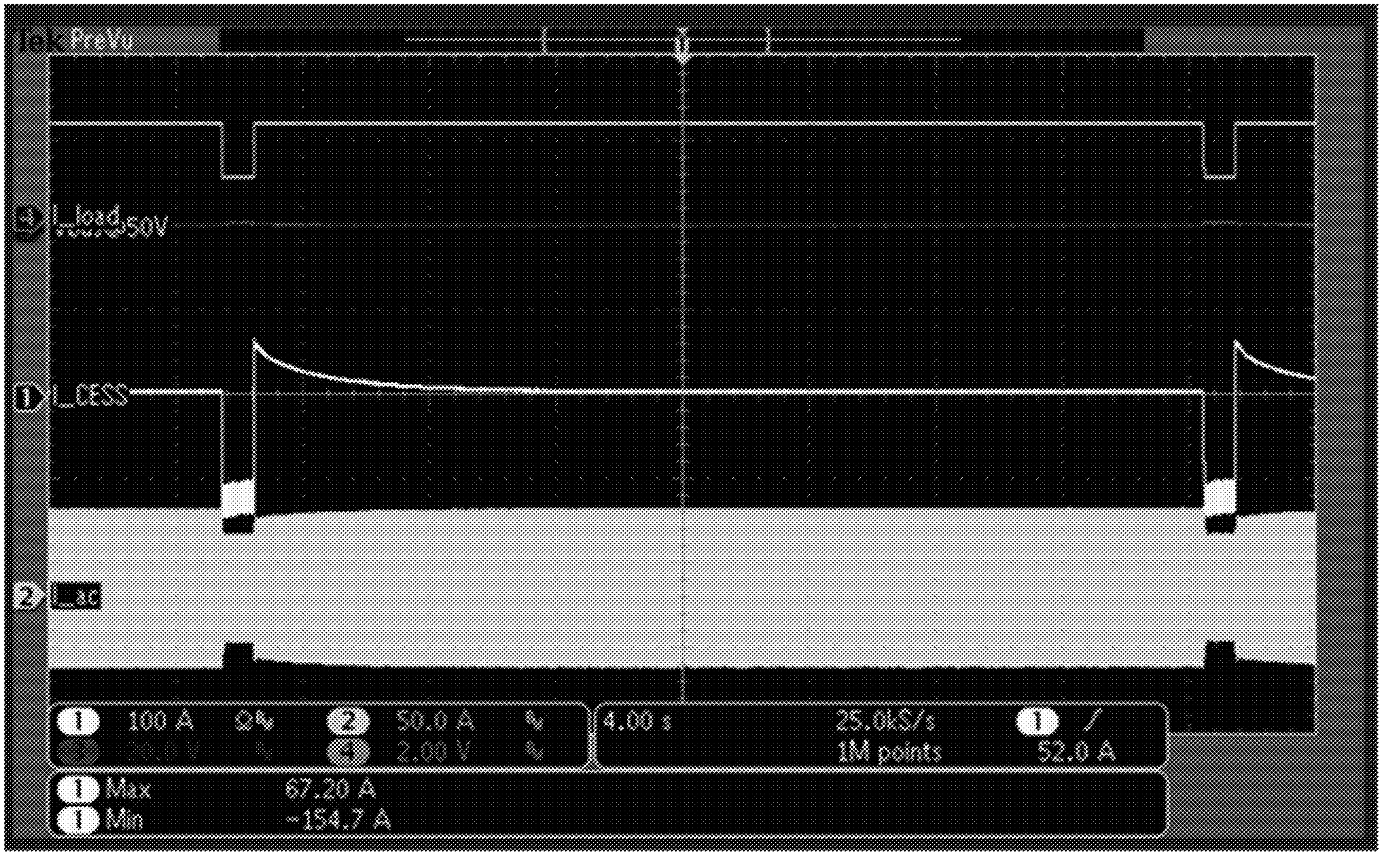
FIG. 14 illustrates a waveform for a CESS passive filtering scheme according to at least one example embodiment.

The benefits of this method are: (1) simple and reliable control scheme; (2) noise immunity; and (3) no data or signal transmission required between the PSS and CESS. A system validation test result for a CESS passive filtering scheme is shown in FIG. 14, where $SOC_{TG}$ is set to 50% for the simulation. Channel 1 is the CESS output current $I_{CESS}$, channel 2 is the input AC current of PSS $I_{AC}$, channel 3 is the bus voltage $V_{BUS}$, and channel 4 is the load current $I_{LOAD}$. As shown, $I_{LOAD}$ steps up and down frequently, and $I_{AC}$ is relatively smooth while the $I_{CESS}$ is following the abruptly changing behavior of the dynamic load current. As can be seen, there is almost no voltage spike or dip on $V_{BUS}$ during load changing moments.

Active Filtering by Regulating PSS Current Information ($I_{PSS\_INFO}$)

The second method involves the CESS 112 actively regulating the signals that imply PSS 104 output current information $I_{PSS\_INFO}$. There are two common signals that are related to $I_{PSS\_INFO}$ which are $I_{SHARE}$ and $V_{BUS}$. $I_{SHARE}$ is an analog signal that represents the PSS output current level and may correspond to a common bus signal used for current sharing functions between power supplies connected to a common bus. Additionally or alternatively, $V_{BUS}$ may be used as or as a basis for $I_{PSS\_INFO}$ since, as shown in FIG. 8, the PSS output voltage is negatively proportional to its output current due to the droop curve. Two active filtering control schemes are discussed in more detail below, dynamic current mitigation (DCM) control and dynamic SOC regulation control (DSR) control.

Dynamic Current Mitigation (DCM) Control

The core idea of the proposed DCM control is monitoring $I_{PSS\_INFO}$ and mitigating its change slew rate by comparing the real-time value with the averaged value. While the real-time value is larger than the average, which implies load increment, the CESS 112 output voltage will increase to mitigate the output current change slew rate of PSS 104.

Figure 15:
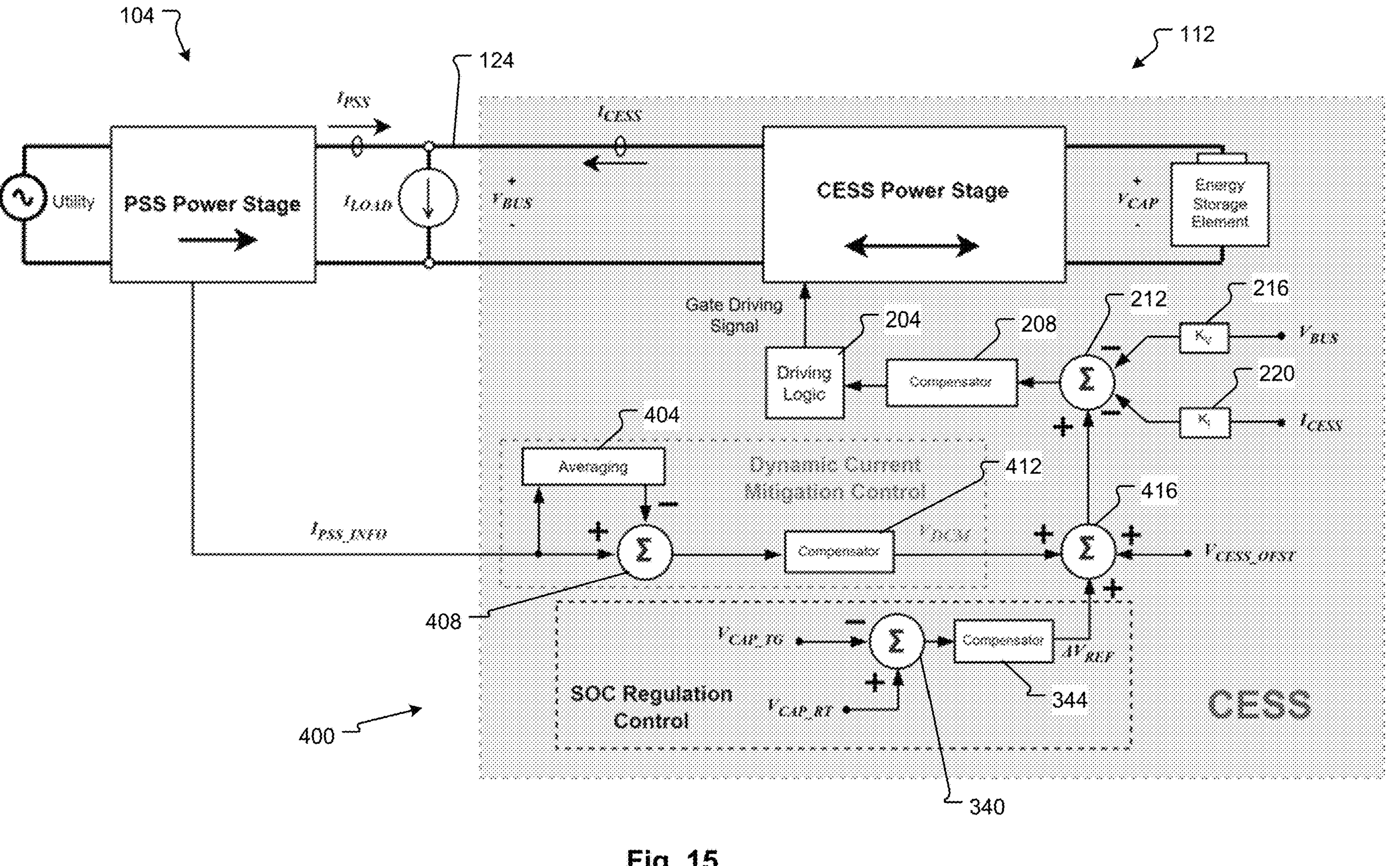
FIG. 15 illustrates a block diagram including components for dynamic current mitigation (DCM) control according to at least one example embodiment.

The proposed DCM controller block diagram is shown in FIG. 15 where the $I_{PSS\_INFO}$ signal represents PSS 104 output current information fed into a dynamic current mitigation (DCM) control loop. As illustrated in FIG. 15, a control circuit 400 includes some of the same elements as described with reference to FIGS. 10 and 12, and as such, these elements are not described again here. For DCM control, control circuit 400 includes an averaging circuit 404 to obtain an average of $I_{PSS\_INFO}$ over time, a summation circuit 408 to determine a difference between output of the averaging circuit 404 and a real time value of $I_{PSS\_INFO}$. Output of the summation circuit 408 is to the compensator 412, which generates a control signal for dynamic current mitigation $V_{DCM}$ for input to summation circuit 416. Summation circuit 416 receives and operations on input from compensators 412 and 344 and on zero current offset point for CESS 112 $V_{CESS\_OFST}$.

As shown, to achieve goal #2 described above, CESS 112 in FIG. 15 also includes a block for SOC regulation which operates in the same way as described with reference to FIG. 12, where $V_{CAP\_TG}$ is the target value which is fixed for regulation and $V_{CAP\_RT}$ is the real-time value of capacitor voltage.

The reaction time of the DCM controller occurs within a few (e.g., five) microseconds so that the CESS 112 can provide or absorb energy induced by a dynamic load. On the other hand, the reaction time of SOC regulation loop is around several to dozens of seconds.

Figure 16A:
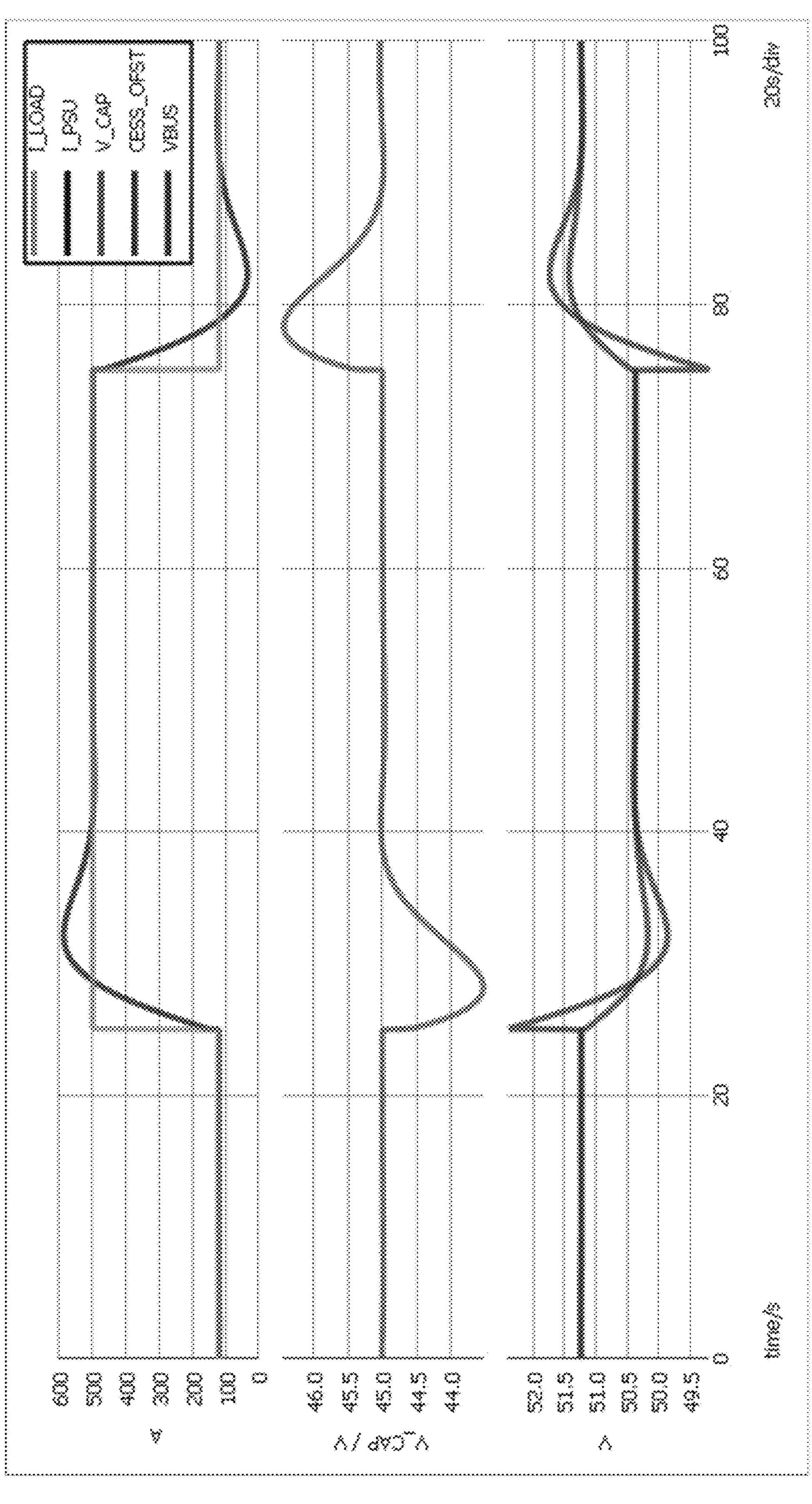
FIG. 16A a simulation for load step/down conditions using the DCM components of FIG. 15 according to at least one example embodiment.

A circuit simulation result for load step up/down conditions of the proposed DCM control block in FIG. 15 is shown in FIG. 16A by waveforms for load current I_LOAD, PSS output current I_PSS, capacitor voltage V_CAP, CESS 112 output offset voltage (CESS_OFST which is the same as $V_{CESS\_0A}$ at previous paragraph), and bus voltage $V_{BUS}$. In this example, the SOC regulation target of V_CAP is 45.0V. As may be appreciated from FIG. 16A, load step up occurs at 25 s, and CESS_OFST steps up immediately due to the DCM controller and mitigates the change in slew rate of PSS output current. As also shown, capacitor voltage starts decreasing at about the same time. Then, CESS_OSFT starts gradually decreasing while I_PSS increases accordingly to a higher level than I_LOAD through the SOC control block to charge the CESS back to the regulation target (e.g., 45V). As shown at the top of the figure, I_PSS becomes equal to I_LOAD at steady state.

As may be further appreciated from FIG. 16A, when load step down occurs at 75 s, CESS_OFST steps down immediately via the DCM controller and mitigates the change in slew rate of PSS output current, while capacitor voltage starts increasing at about the same time. Then, CESS_OSFT starts gradually increasing and I_PSS decreases accordingly to a lower level than I_LOAD through the SOC control block to discharge CESS back to the regulation target. As shown at the top of the figure, I_PSS is equal to I_LOAD at steady state.

Figure 16B:
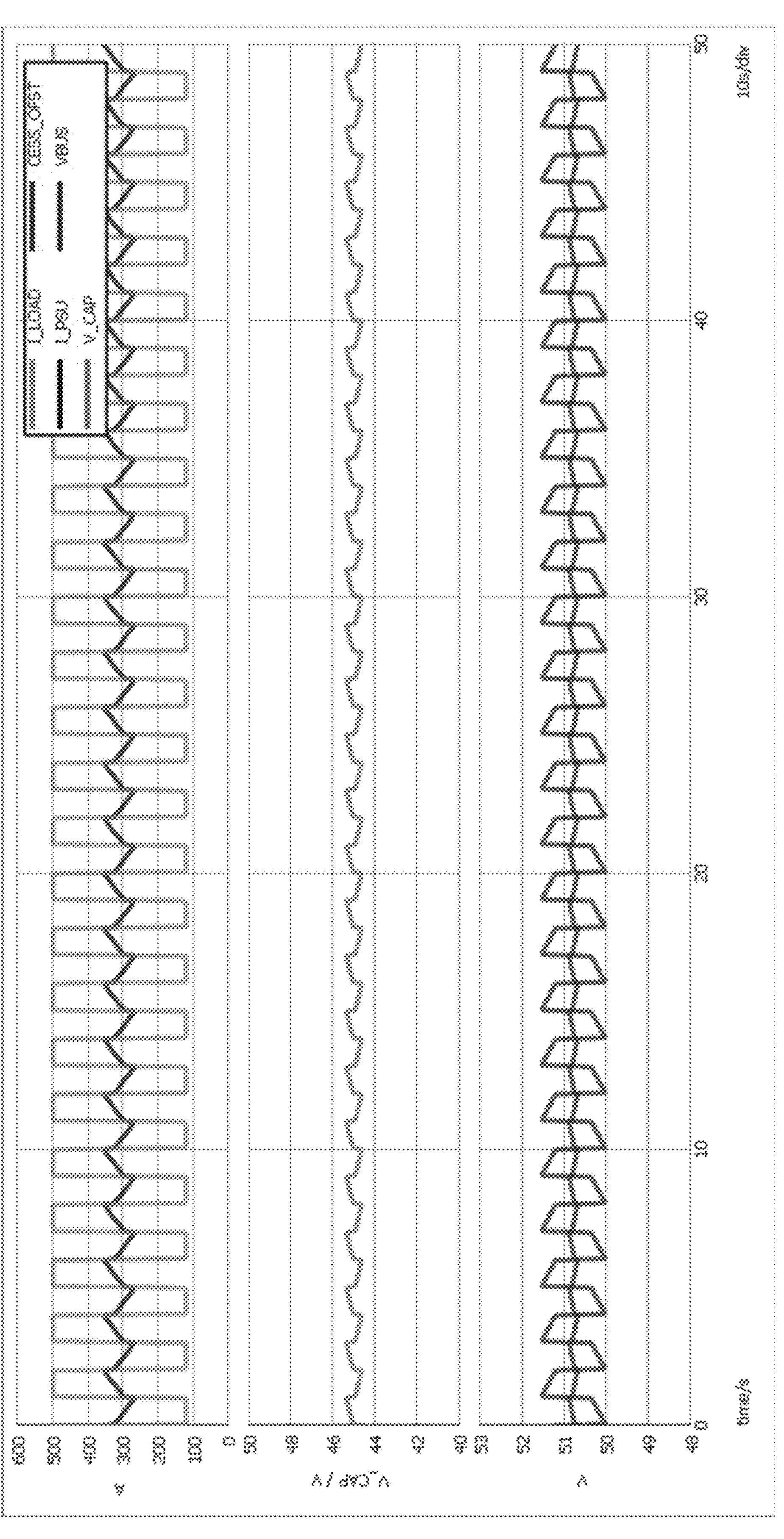
FIG. 16B illustrates a simulation for a frequent pulse load using the DCM components of FIG. 15 according to at least one example embodiment.

FIG. 16B illustrates a circuit simulation result with a frequent pulse load. As shown in FIG. 16B, I_PSS is nearly constant with a 60 A current ripple while the peak to peak value of pulse load variation is 380 A. The averaged SOC value in this example is still 45.0V.

Figure 16C:
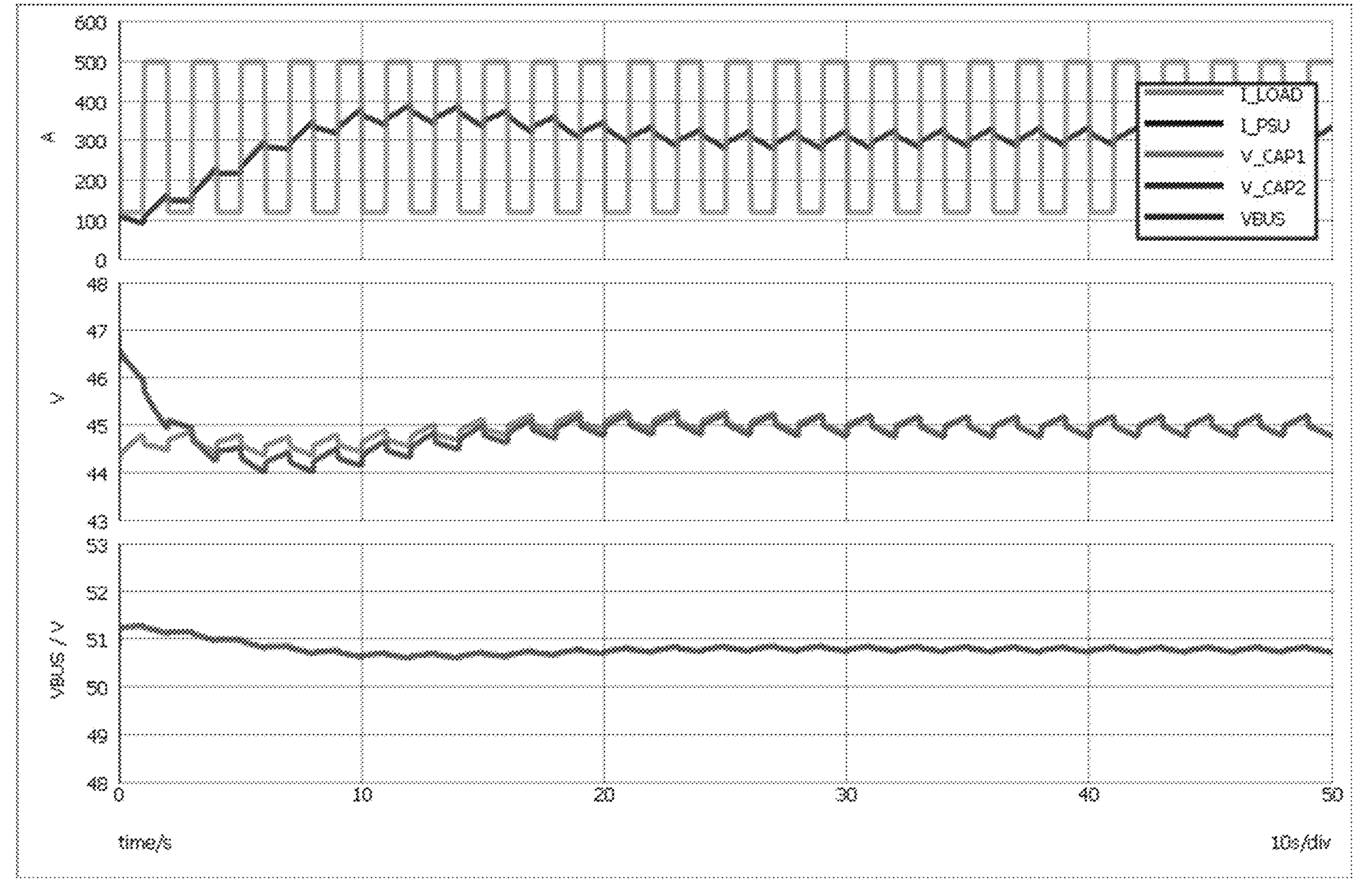
FIG. 16C illustrates a simulation of the DCM components of FIG. 15 when using two CESSs with different SOCs and different capacitances.

FIG. 16C illustrates a circuit simulation result for two CESSs 112 with different SOCs and capacitances at a frequent dynamic load. Capacitance of CAP1 is 500 F and CAP2 is 400 F; The initial value of V_CAP1 is 44.0V and V_CAP2 is 47.0V. After several dynamic load cycles, I_PSS is equivalent to the average value of I_LOAD, and the average value of V_CAP1 and V_CAP2 are equivalent to 45.0V.

Based on the simulation results in FIGS. 16A-16C, it is clear that a DCM controller according to example embodiments successfully slows down the PSS output current change in slew rate for both load step up and down conditions, while the CESS also successfully regulates the capacitors' voltage back to a reference target at steady state.

Dynamic SOC Regulation (DSR) Control

The second scheme for an active filtering function includes adjusting the SOC target value based on $I_{PSS\_INFO}$ such that the higher $I_{PSS\_INFO}$ the lower the SOC regulation target. The DSR control block diagram is shown in FIG. 17.

Figure 17:
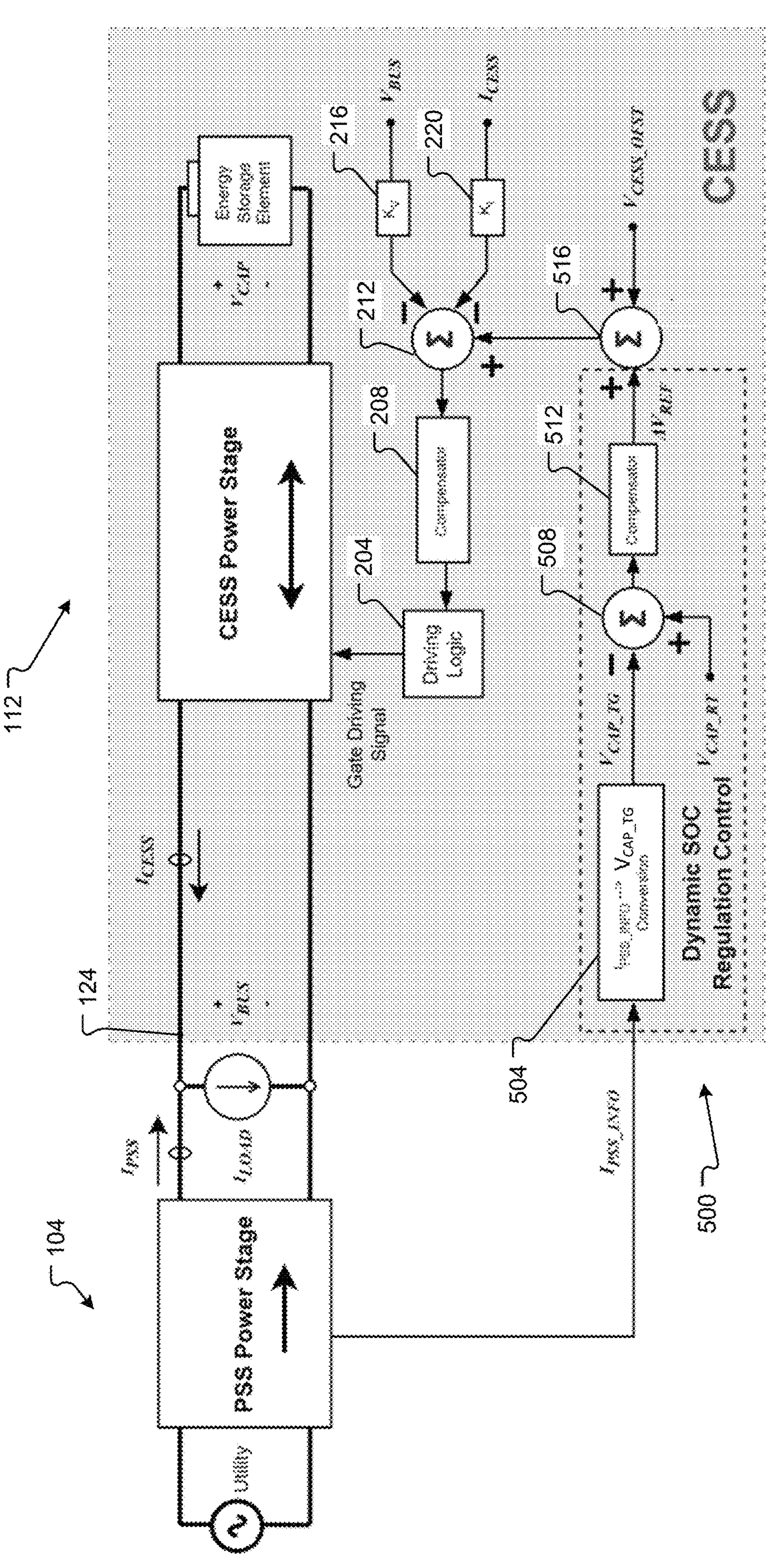
FIG. 17 illustrates a block diagram of components used for dynamic SOC regulation control according to at least one example embodiment.

In more detail, FIG. 17 illustrates a control circuit 500 that includes some of the same elements as FIG. 10, which are not described again here for the sake of brevity. The control circuit 500 further includes a conversion circuit 504 to convert $I_{PSS\_INFO}$ to the capacitor voltage target value $V_{CAP\_TG}$, a summation circuit 508 that operates on the converted $V_{CAP\_TG}$ and the real time value of capacitor voltage $V_{CAP\_RT}$. Compensator 512 receives output of summation circuit 508 and generates signal $\Delta V_{REF}$ which is input to summation circuit 516 that operates on $\Delta V_{REF}$ and $V_{CESS\_OFST}$.

In operation, such as at a load step-up, $I_{PSS\_INFO}$ intends to increase and decrease $V_{CAP\_TG}$ in the DSR control loop, CESS zero current output voltage setpoint $V_{CESS\_0A}$ will increase and release energy to bus 124 accordingly, thus mitigating the PSS output current change in slew rate. After CESS 112 releases energy, the error amount between $V_{CAP\_TG}$ and $V_{CAP\_RT}$ decreases, and $V_{CESS\_0A}$ decreases accordingly, and thus, PSS output current $I_{PSS}$ and $I_{PSS\_INFO}$ increases. As may be appreciated, $I_{PSS}$ becomes equivalent to $I_{LOAD}$ and $V_{CAP\_RT}$ of CESS 112 will become the value corresponding to $I_{PSS\_INFO}$ at steady state.

At load step-down, $I_{PSS\_INFO}$ intends to decrease and increase $V_{CAP\_REF}$ in the DSR control loop, the zero current output voltage setpoint $V_{CESS\_0A}$ of CESS 112 will decrease and absorb energy from bus 124 accordingly, thus, mitigating the PSS output current change in slew rate. After CESS 112 absorbs the energy, the error amount between $V_{CAP\_TG}$ and $V_{CAP\_RT}$ decreases, and $V_{CESS\_0A}$ increases accordingly, and thus, PSS output current $I_{PSS}$ and $I_{PSS\_INFO}$ decreases. $I_{PSS}$ becomes equivalent to $I_{LOAD}$ and $V_{CAP\_RT}$ of CESS 121 will become the value corresponding to $I_{PSS\_INFO}$ at steady state.

Figure 18A:
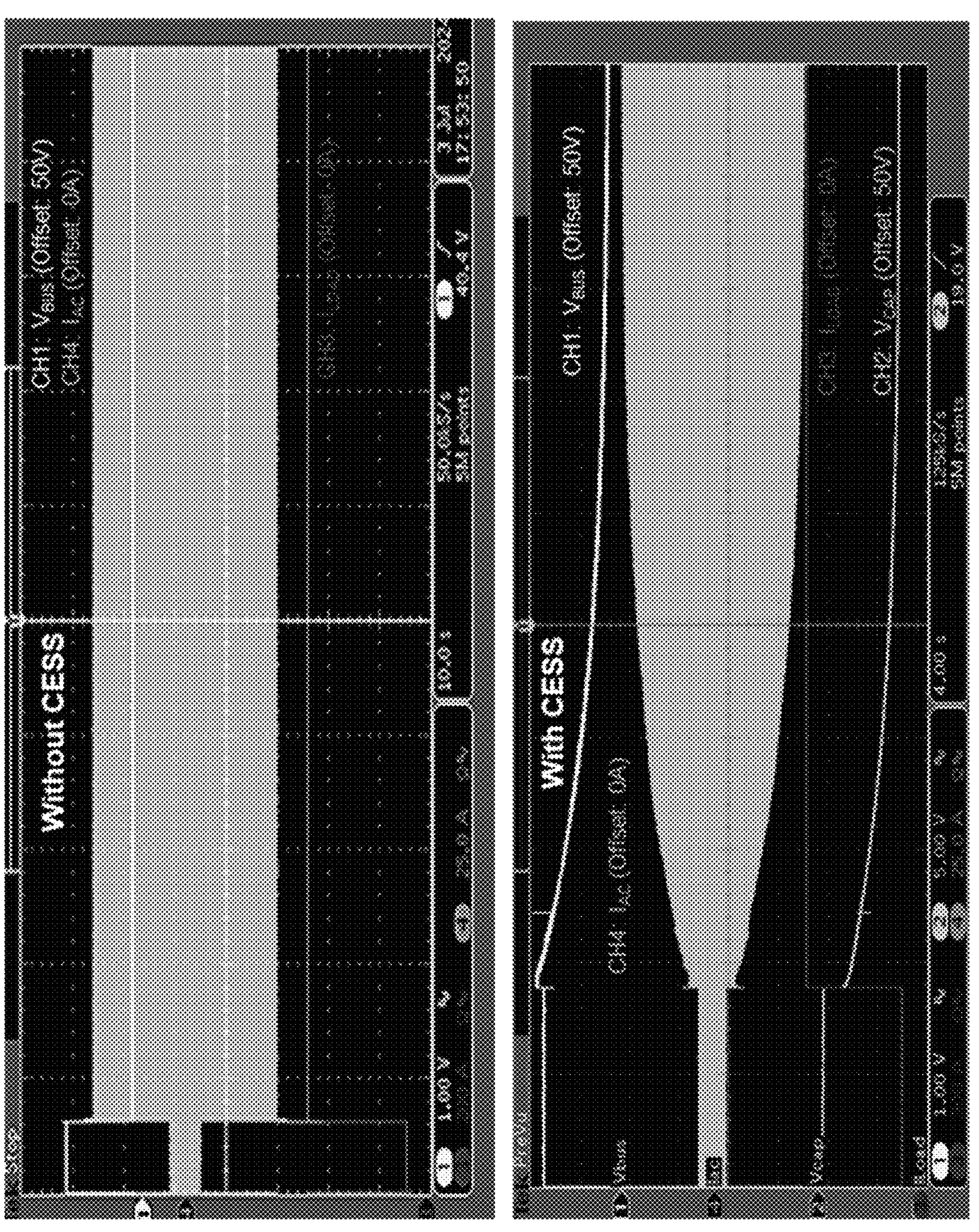
FIG. 18A illustrates a waveform comparison between a CESS with a DSR control scheme and a system without a CESS for a load step-up condition according to at least one example embodiment.
Figure 18B:
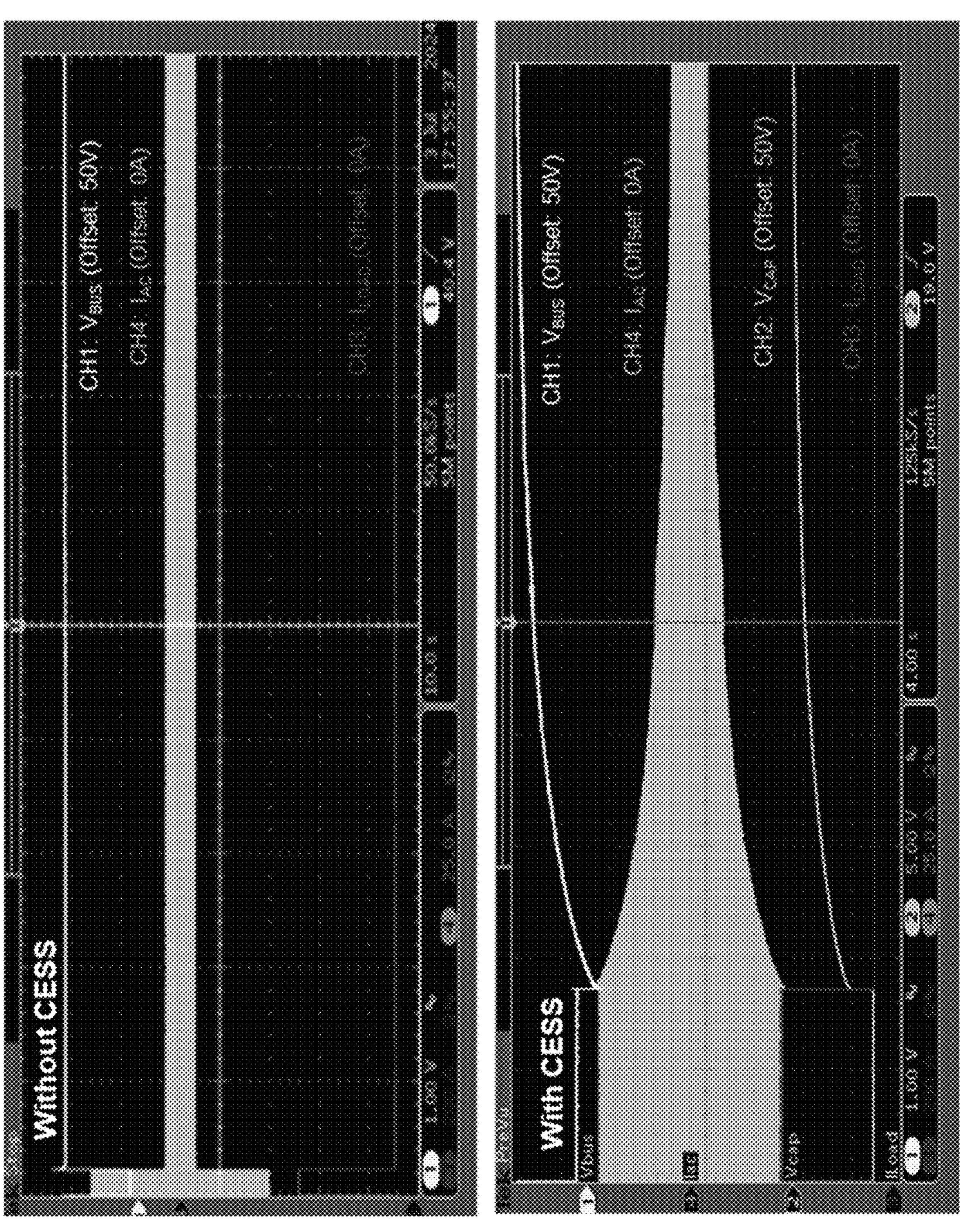
FIG. 18B illustrates a waveform comparison between a CESS with a DSR control scheme and a system without a CESS for a load step-down condition according to at least one example embodiment.
Figure 18C:
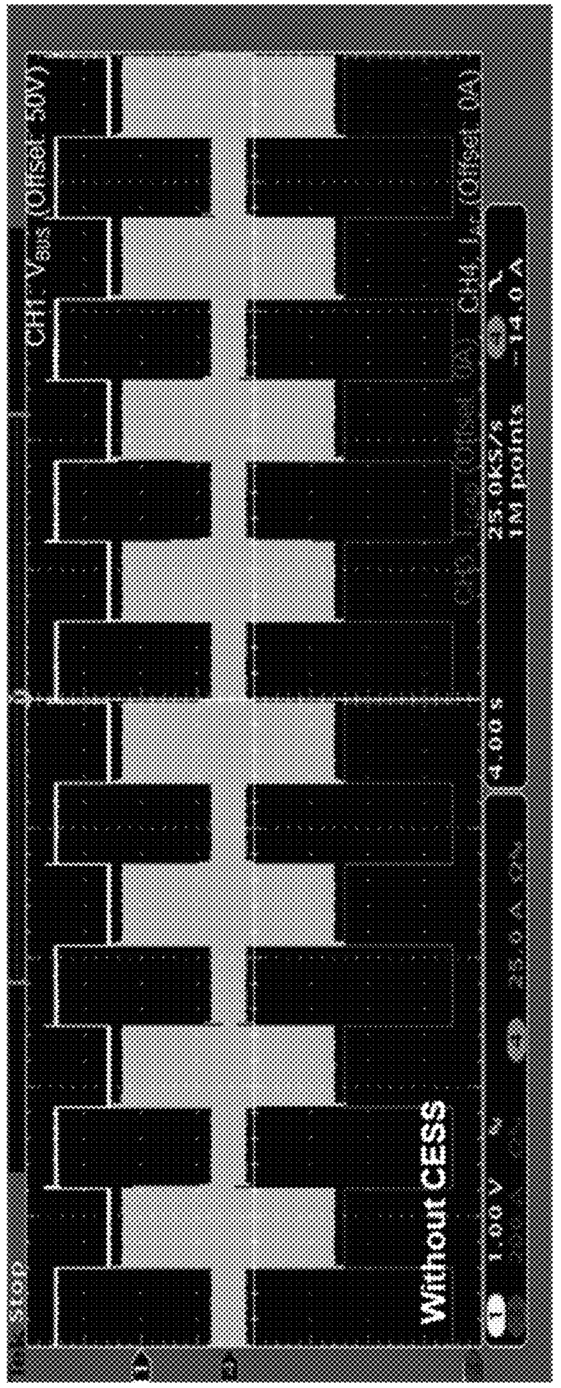
FIG. 18C illustrates how during a pulse-type dynamic load, the ripple of $I_{AC}$ is fairly small for a system with a CESS compared to a system without a CESS according to at least one example embodiment.
Figure 18C:
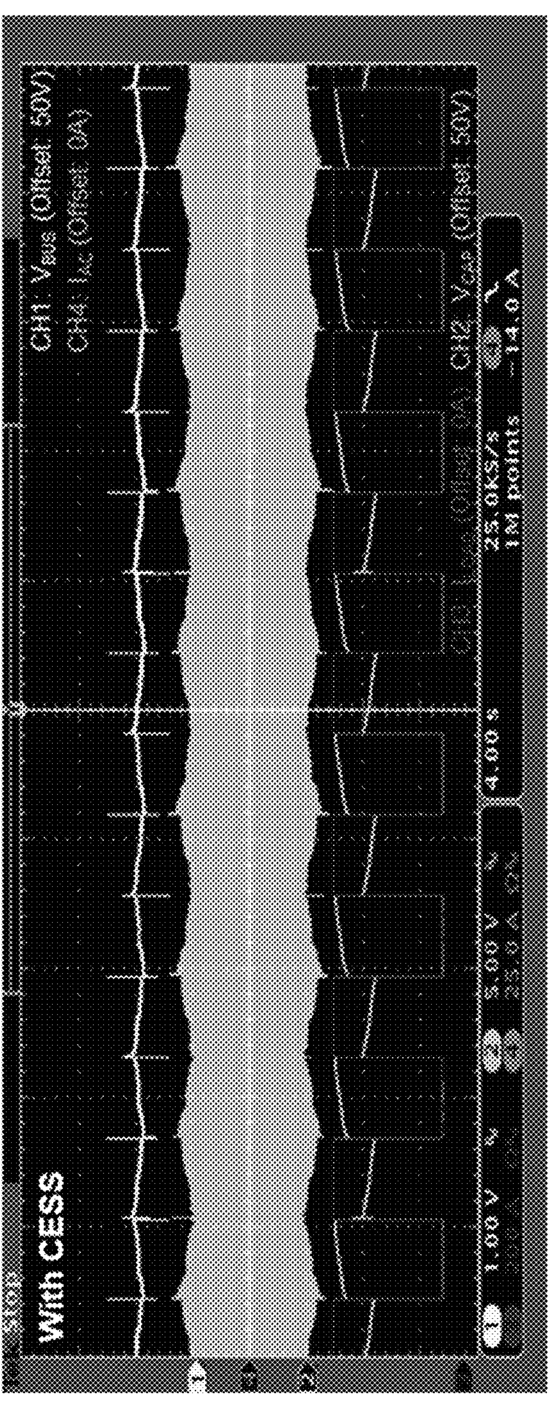

FIG. 18A shows the waveform comparison between a CESS 112 with DSR control scheme and a system without a CESS. Channel 1 is bus voltage $V_{BUS}$, channel 2 is real time capacitor voltage $V_{CAP\_RT}$, channel 3 is load current $I_{LOAD}$, and channel 4 is PSS 104 AC input current $I_{AC}$. According to FIG. 18A, at load a step-up load condition, the AC input current of PSS 104 is gradually increased to a target value while the system without the CESS experiences an abrupt change in AC input current of PSS 104. FIG. 18B shows the same relationship for a load step-down condition. Finally, FIG. 18C shows that during a pulse-type dynamic load, the ripple of $I_{AC}$ is fairly small with a CESS 112 compared to a system without a CESS 112.

In view of the foregoing, it should be appreciated that systems and methods according to example embodiments provide at least the following advantages: symmetrical charge and discharge capability; high power density; able to achieve extremely high cycle counts; faster charge and discharge rates than other technology; high flexibility; high scalability; fast and smooth transition between charge and discharge behavior; high robustness and stability for DC bus voltage regulation; inherent smoothing of utility input current transients; and high robustness power flow management that avoids CESS break points.

Elements of systems described herein include a PSS (Power Supply System) as a voltage source with droop, a CESS (Capacitive Energy Storage System) as a voltage source with droop, a CESS which includes series and parallel connected Lithium or EDL supercapacitors or a combination of an array of series and parallel connected capacitors combined with a plurality of series and parallel connected batteries. Example embodiments further provide a control algorithm for a CESS, coordinated with the control mechanism of a PSS to achieve functions such as: reduction of PSS output power change slew rate, reduction of power line harmonics in the utility input line current, and rapid and smooth bidirectional power flow of the combined power system. Example embodiments further provide a bidirectional power flow control architecture that illustrates the output characteristics of the PSS and CESS and their interactions, and a control algorithm for bidirectional DC-DC converter(s) of a CESS to achieve instantaneous power flow direction change. Advantages of systems and methods described here include symmetrical charge and discharge capability, high power density, high cycle counts Faster charge and discharge rates than other technology, high flexibility, high scalability, fast and smooth transition between charge and discharge behavior, high robustness and stability for DC bus voltage regulation, inherent smoothing of utility input current transients, high robustness power flow management that avoids the CESS break point, and/or adaptive to any PSS without any additional PSS system parameter modification.

In view of the above, it should be appreciated that example embodiments are directed to a power system 100 comprising an energy storage system 112 including a rechargeable energy storage element 116 and a converter 120 connected to the rechargeable energy storage element and configured to connect to a bus 124 so that the energy storage system is connected in parallel with a load 128 and a main power supply system 104. In at least one embodiment, the energy storage system cooperates with the main power supply system to supply power to the load with each of the energy storage system and the main power supply system configured as a voltage source with a corresponding droop function. The system 100 may include a control circuit configured to monitor a voltage of the bus and control the converter to either charge or discharge the rechargeable energy storage element based on the voltage of the bus. In at least one embodiment, the droop function of the energy storage system is $R_{CESS}=(V_{CESS\_MAX}-V_{CESS\_MIN})/(2*\Delta I_{CESS\_MAX}))$, where $R_{CESS}$ is an equivalent output resistance of the energy storage system, $V_{CESS\_MAX}$ is a maximum output voltage of the energy storage system at maximum load in a charge condition, $V_{CESS\_MIN}$ is a minimum output voltage of the energy storage system at maximum load in a discharge condition, and $I_{CESS\_MAX}$ is a maximum output or input current of the energy storage system. In at least one embodiment, the droop function of the main power supply system is $R_{PSS}=(V_{PSS\_0A}-V_{PSS\_MIN})/(I_{PSS\_MAX})$, where $R_{PSS}$ is an equivalent output resistance of the main power supply system, $V_{PSS\_0A}$ is a voltage of the main power supply system at zero load, $V_{PSS\_MIN}$ is a voltage of the main power supply system at maximum load, and $I_{PSS\_MAX}$ is a maximum output current for the main power supply system. In some cases, the control circuit is configured to adjust a zero-current voltage setpoint of the converter upward and downward to regulate a state of charge (SOC) of the rechargeable energy storage element. For example, the control circuit is configured to adjust the zero-current voltage setpoint of the converter based on a real time voltage of the rechargeable energy storage element and a target voltage for the rechargeable energy storage element. In at least one embodiment, the control circuit is configured to filter AC harmonics of the main power supply system. For example, the control circuit is configured to passively filter the AC harmonics based on an equivalent output resistance ratio between the main power supply system and the converter that determines a current ratio between a change in current output by the converter and a change in current output by the main power supply system. In at least one embodiment (e.g., according to FIG. 15), the control circuit is configured to actively filter the AC harmonics by comparing a real time current information of the main power supply system with averaged current information. In another example (e.g., as in FIG. 17), the control circuit is configured to actively filter the AC harmonics by adjusting a SOC target value for the rechargeable storage energy element based on current information of the main power supply system. In conjunction with actively filtering AC harmonics, the control circuit may also be configured to adjust a zero-current voltage setpoint of the converter upward and downward to regulate a SOC of the rechargeable energy storage element. In some examples, the rechargeable energy storage element comprises a plurality of electrically connected capacitors.

According to at least one example embodiment, a power system 100 comprises a bus 124, a main power supply system 104 connected to the bus and configured as a voltage source with a droop function; a rechargeable energy storage system 112 connected to the bus and configured as a voltage source with a droop function. The rechargeable energy storage system may include a rechargeable energy storage element 116 and a converter 120 connected between the rechargeable energy storage element and the bus. The system may include a control circuit configured to monitor a voltage of the bus and to control the converter to either charge or discharge the rechargeable energy storage element based on the voltage of the bus. In at least one example, the droop function of the main power supply system is $R_{PSS}=(V_{PSS\_0A}-V_{PSS\_MIN})/(I_{PSS\_MAX})$, where $R_{PSS}$ is an equivalent output resistance of the main power supply system, $V_{PSS\_0A}$ is a voltage of the main power supply system at zero load, $V_{PSS\_MIN}$ is a voltage of the main power supply system at maximum load, and $I_{PSS\_MAX}$ is a maximum output current for the main power supply system. In at least one example, the droop function of the energy storage system is $R_{CESS}=(V_{CESS\_MAX}-V_{CESS\_MIN})/(2*\Delta I_{CESS\_MAX}))$, where $R_{CESS}$ is an equivalent output resistance of the energy storage system, $V_{CESS\_MAX}$ is a maximum output voltage of the energy storage system at maximum load in a charge condition, $V_{CESS\_MIN}$ is a minimum output voltage of the energy storage system at maximum load in a discharge condition, and $I_{CESS\_MAX}$ is a maximum output current of the energy storage system. The control circuit may be configured to adjust a zero-current voltage setpoint of the converter upward and downward to regulate a state of charge (SOC) of the rechargeable energy storage element. For example, the control circuit is configured to adjust the zero-current voltage setpoint of the converter based on a real time voltage of the rechargeable energy storage element and a target voltage for the rechargeable energy storage element. The control circuit may be further configured to filter AC harmonics of the main power supply system. For example, the control circuit is configured to passively filter the AC harmonics based on an equivalent output resistance ratio between the main power supply system and the converter that determines a current ratio between a change in current output by the converter and a change in current output by the main power supply system. Additionally or alternatively, the control circuit is configured to actively filter the AC harmonics by comparing a real time current information of the main power supply system with averaged current information and/or by adjusting a SOC target value for the rechargeable storage energy element based on current information of the main power supply system.

At least one embodiment is directed to a power system comprising a main power supply system 104 having an output characteristic of a voltage source with a droop function, a bus 124 configured to connect to a load, a rechargeable energy storage system 112 connected to the bus having an output characteristic of a voltage source with a droop function, and a control circuit configured to monitor a voltage of the bus and control the rechargeable energy storage system to either charge or discharge to or from the bus based on the voltage of the bus. The output characteristic of the main power supply system and the output characteristic of the rechargeable energy storage system may enable the main power supply system and the rechargeable energy storage system to regulate the voltage of the bus independent of one another.

Here, it should be appreciated that one or more of the above-described elements may be included on a semiconductor chip as a system-on-chip (SoC). Each chip (or die) may include a semiconductor substrate, such as silicon, having electronic components mounted on and/or formed therein. Such a chip may include electronic memory while the other chip in the chip stack may include processing/control circuitry for controlling the electronic memory. The electronic memory may be a computer readable medium including instructions that are executable by the processor. The memory may include any type of computer memory device, and may be volatile or non-volatile in nature. In some embodiments, the memory may include a plurality of different memory devices. Non-limiting examples of memory include Random Access Memory (RAM), Read Only Memory (ROM), flash memory, Electronically-Erasable Programmable ROM (EEPROM), Dynamic RAM (DRAM), etc. The memory may include instructions that enable the processor to control various functions and to store data. The memory may be local (e.g., integrated with) the processor and/or separate from the processor. The processor may correspond to one or many computer processing devices. For instance, the processor may be provided as a Field Programmable Gate Array (FPGA), an Application-Specific Integrated Circuit (ASIC), any other type of Integrated Circuit (IC) chip, a collection of IC chips, a microcontroller, a collection of microcontrollers, or the like. As a more specific example, the processor may be provided as a microprocessor, Central Processing Unit (CPU), or plurality of microprocessors that are configured to execute the instructions sets stored in memory. The processor may perform read and/or write operations for the memory and/or enable various functions upon executing the instructions stored in memory.

It should be further appreciated that elements describe herein may include one or more communication interfaces that enable communication with other elements in the system. These communication interfaces include wired and/or wireless communication interfaces for exchanging data and control signals between one another. Examples of wired communication interfaces/connections include Ethernet connections, HDMI connections, connections that adhere to PCI/PCIe standards and SATA standards, and/or the like. Examples of wireless interfaces/connections include Wi-Fi connections, LTE connections, Bluetooth connections, NFC connections, and/or the like.

The phrases “at least one,” “one or more,” “or,” and “and/or” are open-ended expressions that are both conjunctive and disjunctive in operation. For example, each of the expressions “at least one of A, B and C,” “at least one of A, B, or C,” “one or more of A, B, and C,” “one or more of A, B, or C,” “A, B, and/or C,” and “A, B, or C” means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

The terms "determine," "calculate," "compute," and variations thereof, as used herein, are used interchangeably and include any type of methodology, process, mathematical operation or technique.

Any one or more of the aspects/embodiments as substantially disclosed herein.

Any one or more of the aspects/embodiments as substantially disclosed herein optionally in combination with any one or more other aspects/embodiments as substantially disclosed herein.

One or more means adapted to perform any one or more of the above aspects/embodiments as substantially disclosed herein.

What is claimed is:

1. A power system, comprising:

an energy storage system including:

a rechargeable energy storage element; and a converter connected to the rechargeable energy storage element and configured to connect to a bus so that the energy storage system is connected in parallel with a load and a main power supply system, the energy storage system cooperating with the main power supply system to supply power to the load with each of the energy storage system and the main power supply system configured as a voltage source with a corresponding droop function; and a control circuit configured to:

monitor a voltage of the bus; and control the converter to either charge or discharge the rechargeable energy storage element based on the voltage of the bus, wherein the control circuit is configured to adjust a zero-current voltage setpoint of the converter upward and downward to regulate a state of charge (SOC) of the rechargeable energy storage element.

2. The power system of claim 1, wherein the droop function of the energy storage system is $R_{CESS}=(V_{CESS\_MAX}-V_{CESS\_MIN})/(2*\Delta I_{CESS\_MAX})$), where $R_{CESS}$ is an equivalent output resistance of the energy storage system, $V_{CESS\_MAX}$ is a maximum output voltage of the energy storage system at maximum load in a charge condition, $V_{CESS\_MIN}$ is a minimum output voltage of the energy storage system at maximum load in a discharge condition, and $I_{CESS\_MAX}$ is a maximum output or input current of the energy storage system.

3. The power system of claim 2, wherein the droop function of the main power supply system is $R_{PSS}=(V_{PSS\_0A}-V_{PSS\_MIN})/(I_{PSS\_MAX})$, where $R_{PSS}$ is an equivalent output resistance of the main power supply system, $V_{PSS\_0A}$ is a voltage of the main power supply system at zero load, $V_{PSS\_MIN}$ is a voltage of the main power supply system at maximum load, and $I_{PSS\_MAX}$ is a maximum output current for the main power supply system.

4. The power system of claim 1, wherein the control circuit is configured to adjust the zero-current voltage setpoint of the converter based on a real time voltage of the rechargeable energy storage element and a target voltage for the rechargeable energy storage element.

5. The power system of claim 1, wherein the control circuit is configured to filter AC harmonics of the main power supply system.

6. The power system of claim 5, wherein the control circuit is configured to passively filter the AC harmonics based on an equivalent output resistance ratio between the main power supply system and the converter that determines a current ratio between a change in current output by the converter and a change in current output by the main power supply system.

7. The power system of claim 5, wherein the control circuit is configured to actively filter the AC harmonics by comparing a real time current information of the main power supply system with averaged current information.

8. The power system of claim 5, wherein the control circuit is configured to actively filter the AC harmonics by adjusting a SOC target value for the rechargeable storage energy element based on current information of the main power supply system.

9. The power system of claim 1, wherein the rechargeable energy storage element comprises a plurality of electrically connected capacitors.

10. A power system, comprising:

a bus;

a main power supply system connected to the bus and configured as a voltage source with a droop function;

a rechargeable energy storage system connected to the bus and configured as a voltage source with a droop function, the rechargeable energy storage system including a rechargeable energy storage element and a converter connected between the rechargeable energy storage element and the bus; and a control circuit configured to:

monitor a voltage of the bus; and control the converter to either charge or discharge the rechargeable energy storage element based on the voltage of the bus, wherein the control circuit is configured to adjust a zero-current voltage setpoint of the converter upward and downward to regulate a state of charge (SOC) of the rechargeable energy storage element.

11. The power system of claim 10, wherein the droop function of the main power supply system is $R_{PSS}=(V_{PSS\_0A}-V_{PSS\_MIN})/(I_{PSS\_MAX})$, where $R_{PSS}$ is an equivalent output resistance of the main power supply system, $V_{PSS\_0A}$ is a voltage of the main power supply system at zero load, $V_{PSS\_MIN}$ is a voltage of the main power supply system at maximum load, and $I_{PSS\_MAX}$ is a maximum output current for the main power supply system.

12. The power system of claim 11, wherein the droop function of the rechargeable energy storage system is $R_{CESS}=(V_{CESS\_MAX}-V_{CESS\_MIN})/(2*\Delta I_{CESS\_MAX}))$, where $R_{CESS}$ is an equivalent output resistance of the energy storage system, $V_{CESS\_MAX}$ is a maximum output voltage of the energy storage system at maximum load in a charge condition, $V_{CESS\_MIN}$ is a minimum output voltage of the energy storage system at maximum load in a discharge condition, and $I_{CESS\_MAX}$ is a maximum output current of the energy storage system.

13. The power system of claim 10, wherein the control circuit is configured to adjust the zero-current voltage set-point of the converter based on a real time voltage of the rechargeable energy storage element and a target voltage for the rechargeable energy storage element.

14. The power system of claim 10, wherein the control circuit is configured to filter AC harmonics of the main power supply system.

15. The power system of claim 14, wherein the control circuit is configured to passively filter the AC harmonics based on an equivalent output resistance ratio between the main power supply system and the converter that determines a current ratio between a change in current output by the converter and a change in current output by the main power supply system.

16. The power system of claim 14, wherein the control circuit is configured to actively filter the AC harmonics by comparing a real time current information of the main power supply system with averaged current information or by adjusting a SOC target value for the rechargeable storage energy element based on current information of the main power supply system.

17. A power system, comprising:

a main power supply system having an output characteristic of a voltage source with a droop function;

a bus configured to connect to a load;

a rechargeable energy storage system connected to the bus having an output characteristic of a voltage source with a droop function; and a control circuit configured to:

monitor a voltage of the bus; and control the rechargeable energy storage system to either charge or discharge to or from the bus based on the voltage of the bus, wherein the output characteristic of the main power supply system and the output characteristic of the rechargeable energy storage system enable the main power supply system and the rechargeable energy storage system to regulate the voltage of the bus independent of one another, wherein the control circuit is configured to adjust a zero-current voltage set-point of a converter in the rechargeable energy storage system upward and downward to regulate a state of charge (SOC) of a rechargeable energy storage element in the rechargeable energy storage system.

* * * * *